United States Patent

Ducat et al.

[11] Patent Number: 5,917,107
[45] Date of Patent: Jun. 29, 1999

[54] QUENCH LOADER FOR INSTALLING GLASS SHEET QUENCH MODULE SET

[75] Inventors: Paul D. Ducat; David B. Nitschke, both of Perrysburg; Dean M. Nitschke, Maumee, all of Ohio; Eustace Harold Mumford, Ottawa Lake, Mich.

[73] Assignee: Glasstech, Inc., Perrysburg, Ohio

[21] Appl. No.: 08/975,262

[22] Filed: Nov. 20, 1997

[51] Int. Cl.⁶ .......................... C03B 23/00; C03B 27/00; C03B 29/00
[52] U.S. Cl. .................. 65/348; 65/273; 65/349; 65/351
[58] Field of Search .............................. 65/273, 306, 348, 65/349, 351, 114

[56] References Cited

U.S. PATENT DOCUMENTS

| | | |
|---|---|---|
| 3,806,312 | 4/1974 | McMaster et al. . |
| 3,936,291 | 2/1976 | McMaster . |
| 3,947,242 | 3/1976 | McMaster et al. . |
| 3,994,711 | 11/1976 | McMaster . |
| 4,204,854 | 5/1980 | McMaster et al. . |
| 4,222,763 | 9/1980 | McMaster . |
| 4,282,026 | 8/1981 | McMaster et al. . |
| 4,361,432 | 11/1982 | McMaster et al. . |
| 4,404,011 | 9/1983 | McMaster . |
| 4,437,871 | 3/1984 | McMaster et al. . |
| 4,470,838 | 9/1984 | McMaster et al. . |
| 4,512,460 | 4/1985 | McMaster . |
| 4,525,193 | 6/1985 | McMaster et al. . |
| 4,575,390 | 3/1986 | McMaster . |
| 4,661,141 | 4/1987 | Nitschke et al. . |
| 4,781,745 | 11/1988 | Mumford . |
| 4,830,649 | 5/1989 | Friedel et al. ............................. 65/104 |
| 4,946,491 | 8/1990 | Barr . |
| 5,004,491 | 4/1991 | McMaster et al. . |
| 5,092,916 | 3/1992 | McMaster . |
| 5,137,561 | 8/1992 | Schnabel, Jr. . |
| 5,158,592 | 10/1992 | Buckingham . |
| 5,230,728 | 7/1993 | McMaster . |
| 5,385,786 | 1/1995 | Shetterly et al. . |
| 5,472,470 | 12/1995 | Kormanyos et al. . |
| 5,641,334 | 6/1997 | Kianta et al. ............................. 65/118 |

*Primary Examiner*—James Derrington
*Assistant Examiner*—Jacqueline A. Ruller
*Attorney, Agent, or Firm*—Brooks & Kushman P.C.

[57] ABSTRACT

A glass sheet quench station loader (42) and method for installing a quench module set (44) of lower and upper quench modules (46,48) includes a quench carriage (440) of a horizontally opening U shape that receives the quench modules for the loading. Mounts (446,454) mount the quench modules for movement to the quench station (40) and for subsequent movement from the quench station to permit installation of another quench module set for another production run. The quench loader (42) includes an overhead crane (447) and an overhead railway (448) along which the crane moves to move the quench carriage (440) and the quench modules mounted thereby to and from the quench station.

17 Claims, 15 Drawing Sheets

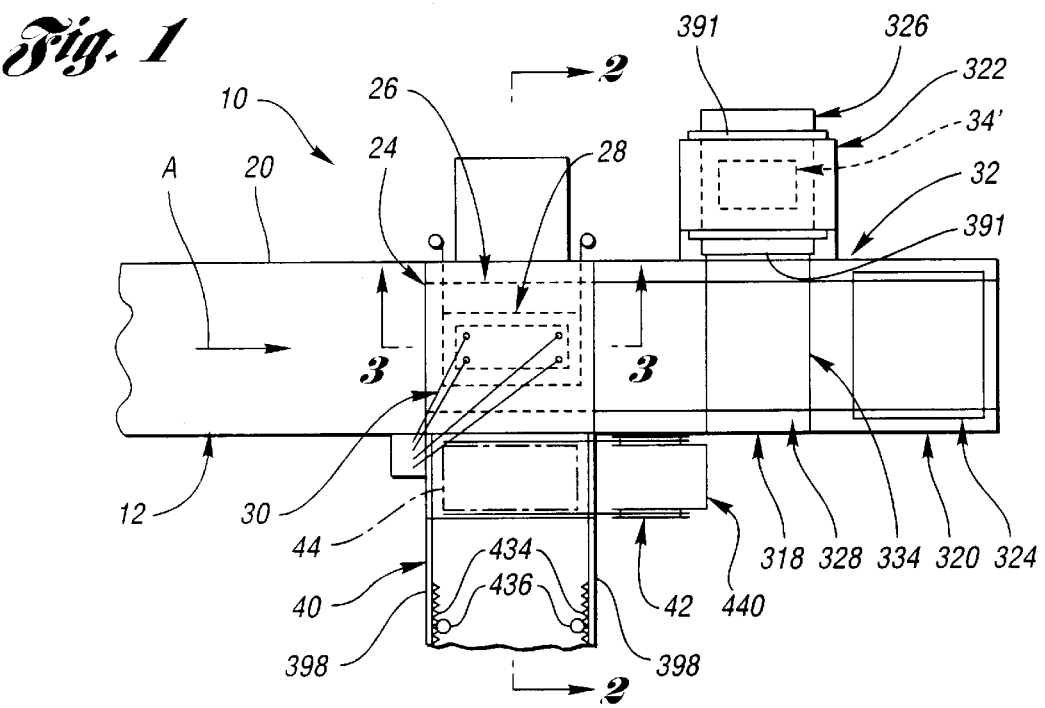
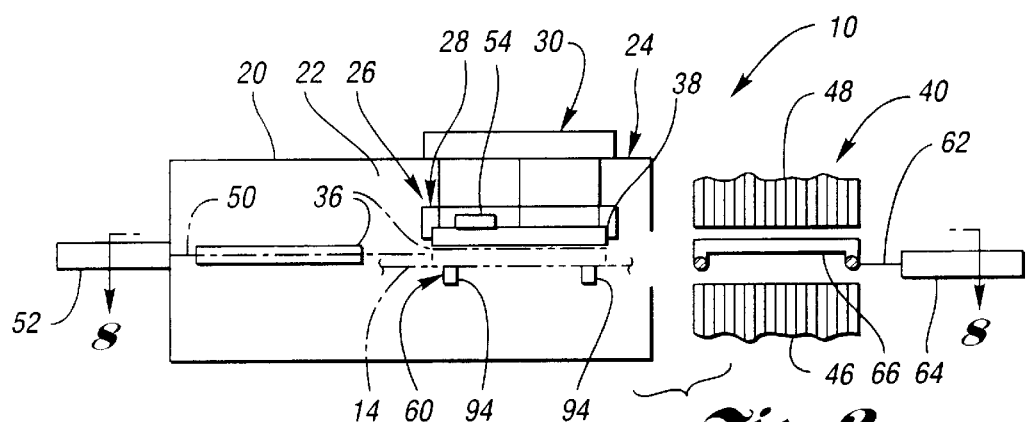
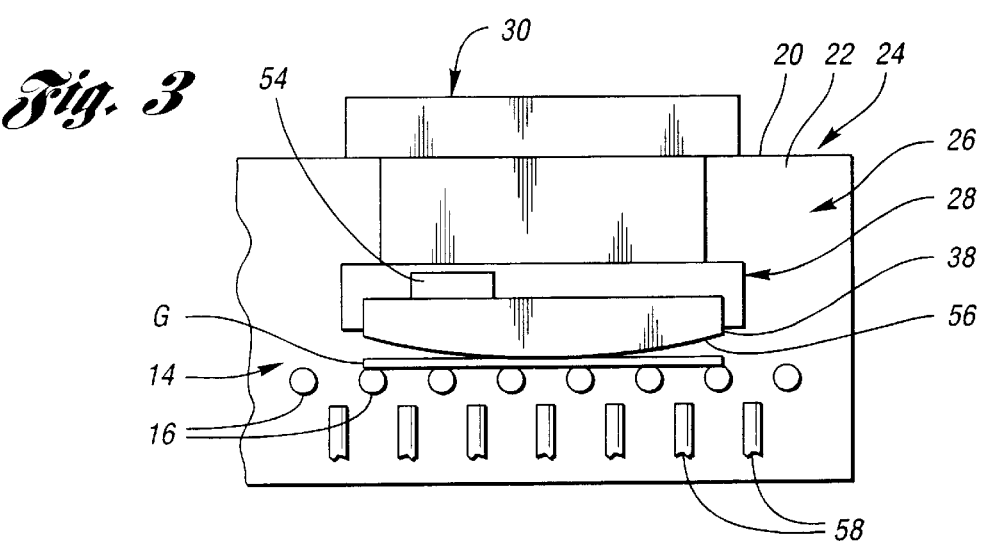

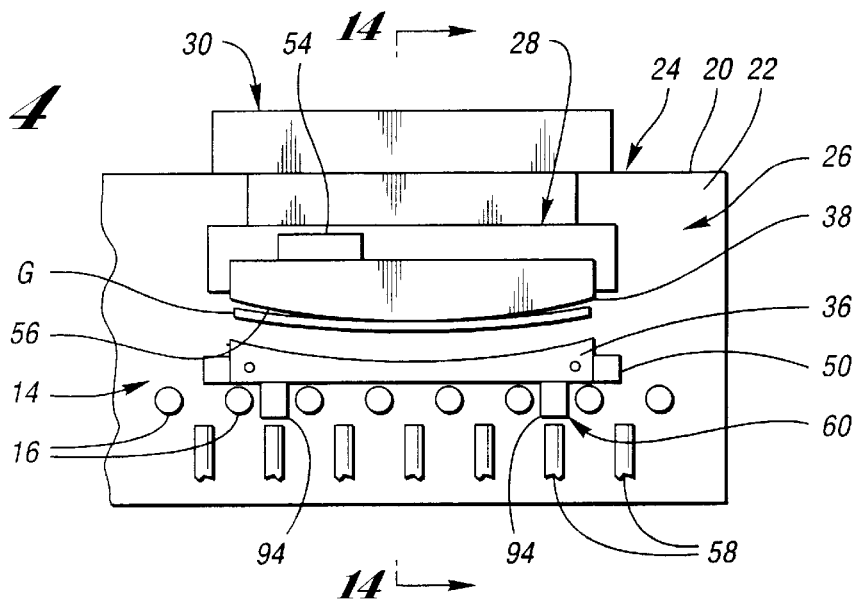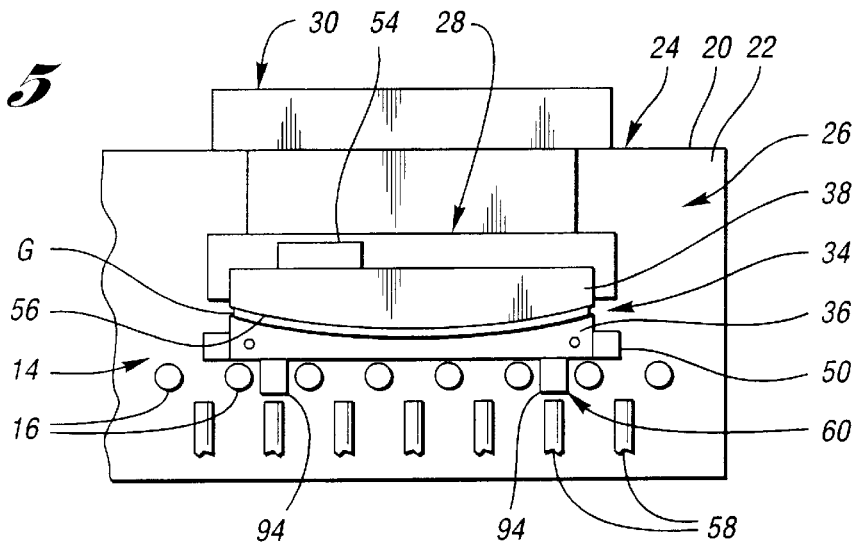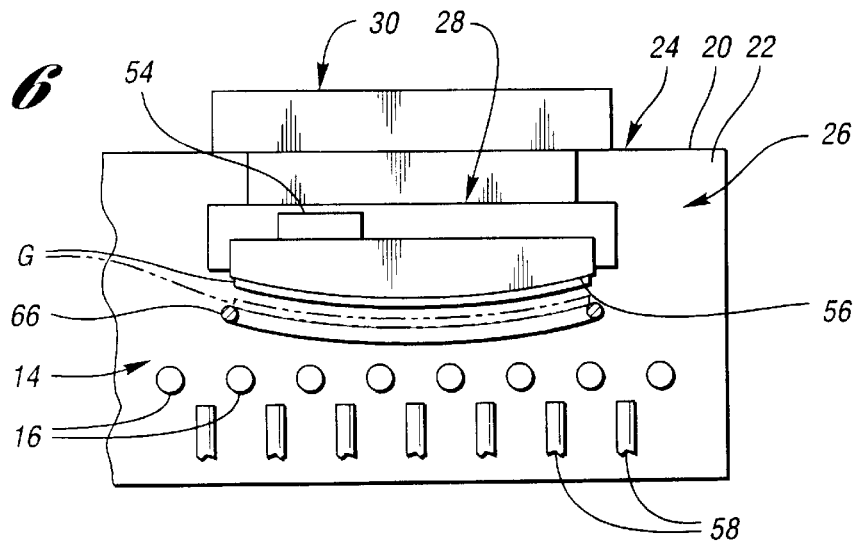

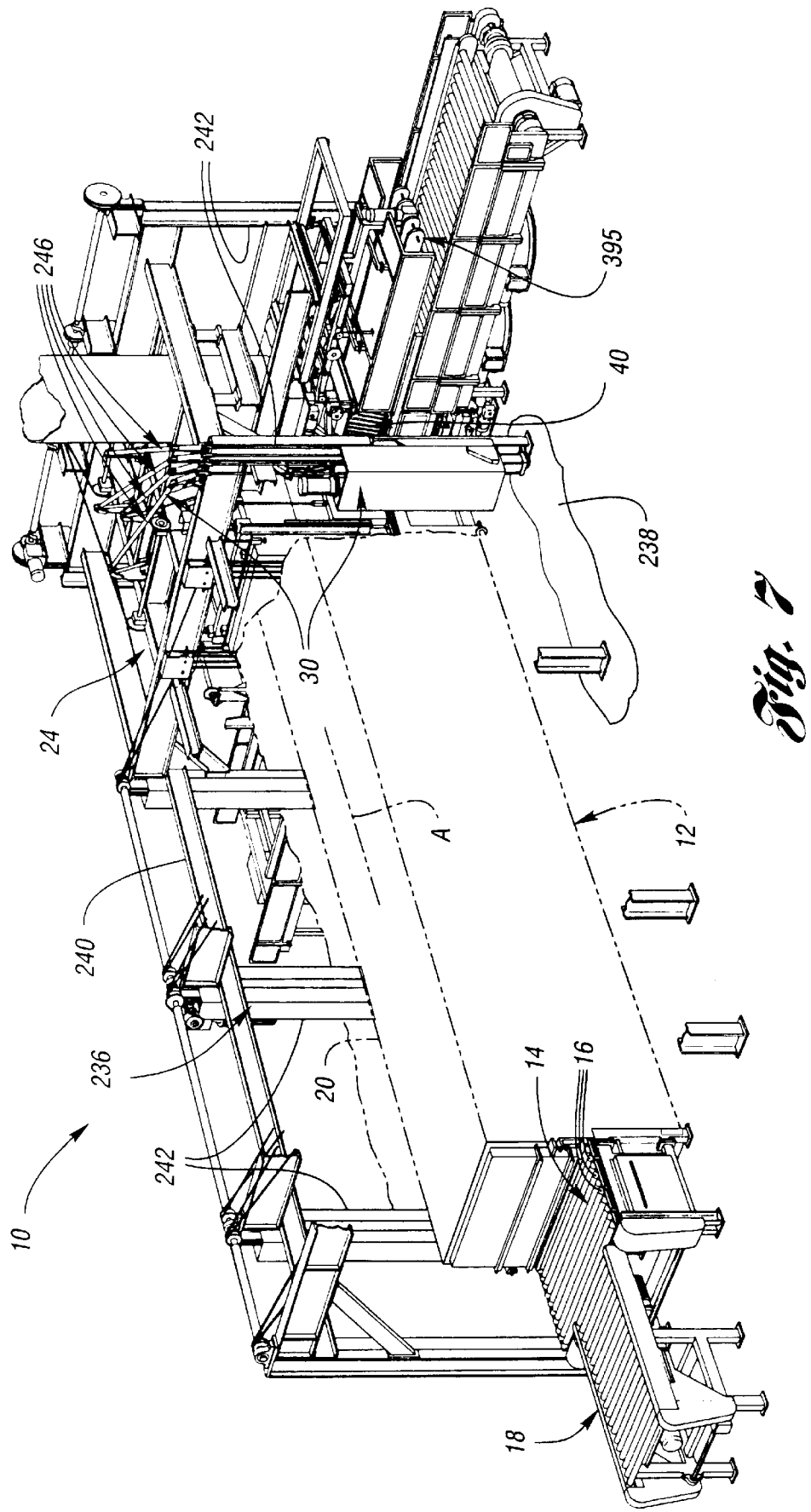

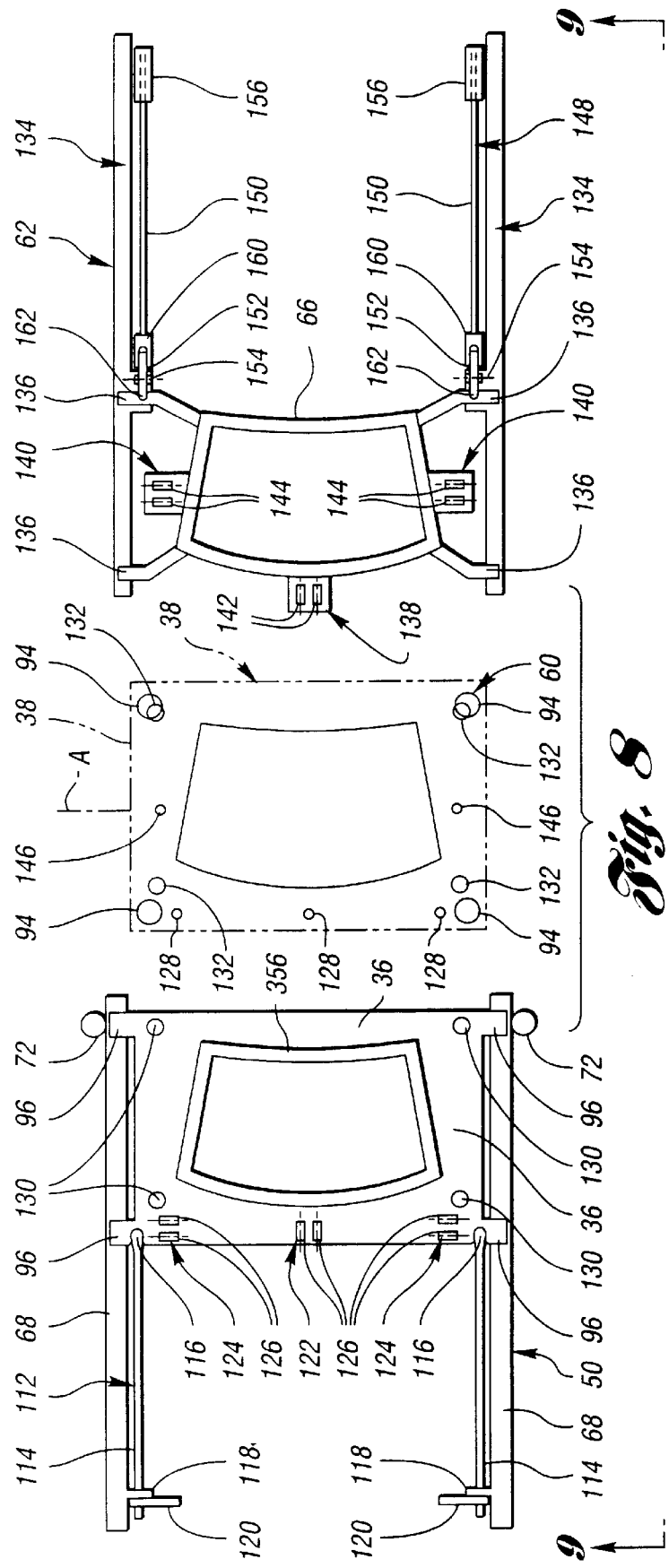

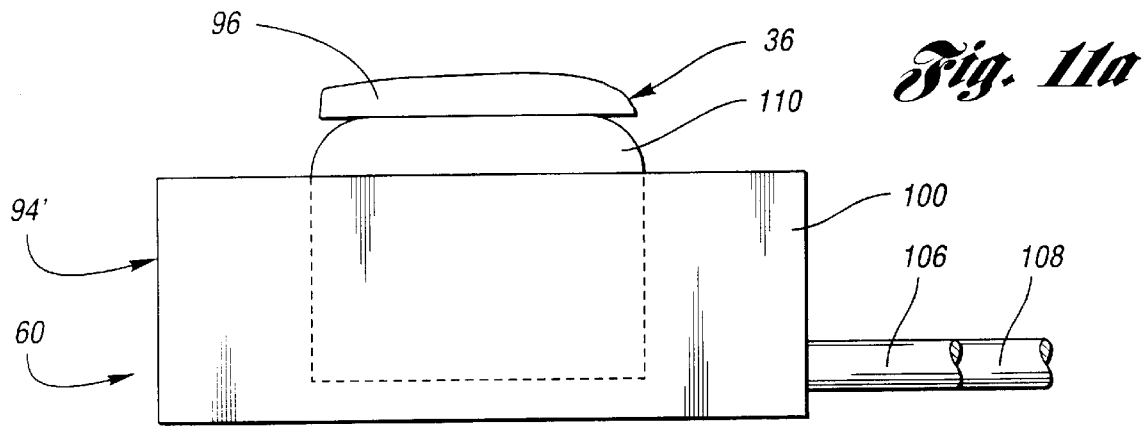
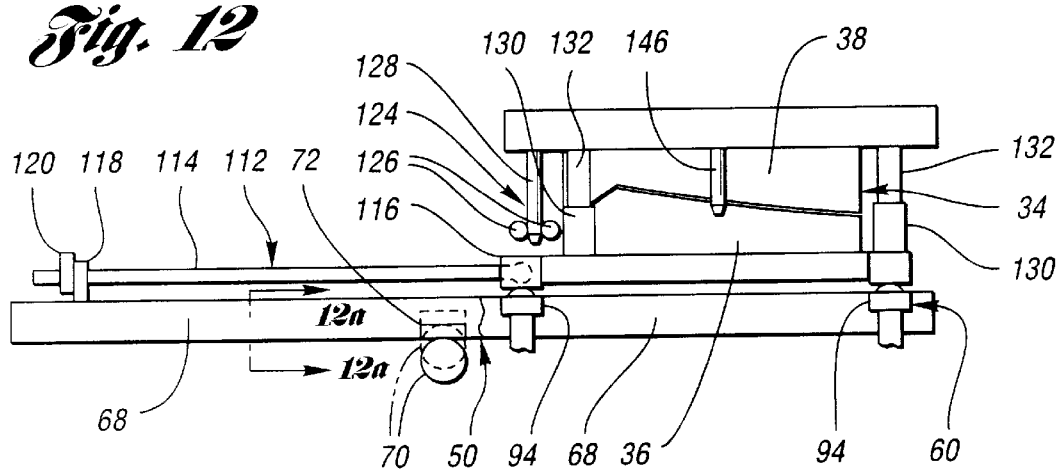
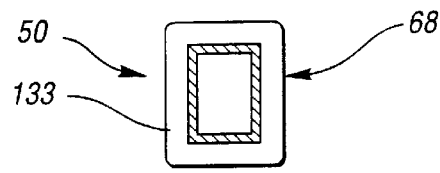
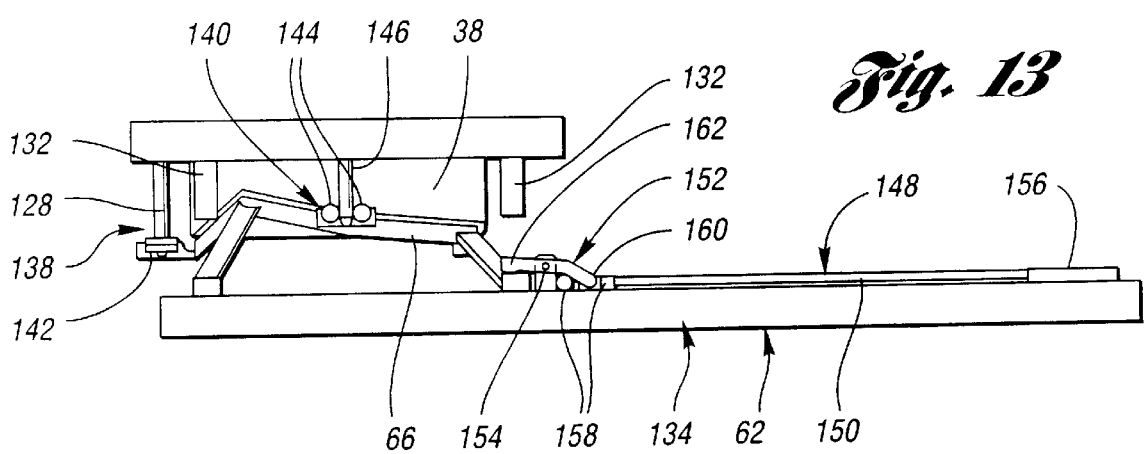

QUENCH LOADER FOR INSTALLING GLASS SHEET QUENCH MODULE SET

TECHNICAL FIELD

This invention relates to a glass sheet forming and quench system including a quench loader for installing a set of lower and upper quench modules and also relates to a method for installing the quench modules.

BACKGROUND ART

Glass sheets are conventionally formed by heating within a furnace and then forming within a heated chamber prior to delivery for cooling. Such cooling can be slow cooling to provide annealing or faster cooling that provides heat strengthening or tempering. In connection with heating of the glass sheets, see U.S. Pat. Nos.: 3,806,312 McMaster et al.; 3,947,242 McMaster et al.; 3,994,711 McMaster; 4,404,011 McMaster; and 4,512,460 McMaster. In connection with glass sheet forming, see U.S. Pat. Nos.: 4,282,026 McMaster et al.; 4,437,871 McMaster et al.; 4,575,390 McMaster; 4,661,141 Nitschke et al.; 5,004,491 McMaster et al.; and 5,472,470 Kormanyos et al. In connection with the cooling, see U.S. Pat. Nos.: 3,936,291 McMaster; 4,470,838 McMaster et al.; 4,525,193 McMaster et al.; 4,946,491 Barr; and 5,385,786 Shetterly et al.

During the forming process, the heated glass sheets can be supported by a vacuum generated at a downwardly facing mold whose initial support of the glass sheet upon being received from a heating conveyor can be assisted by an upwardly directed heated gas flow that can be provided by gas jet pumps, such as disclosed by U.S. Pat. Nos. 4,204,854 McMaster et al. and 4,222,763 McMaster.

For effective high yield glass sheet forming, it is important for cooperable molds to be properly positioned upon mounting and aligned with each other during each cycle of operation therebetween, which is made more difficult due to the heated environment in which the glass sheet forming takes place. See, U.S. Pat. Nos.: 4,781,745 Mumford; 5,158,592 Buckingham; 5,092,916 McMaster; and 5,230,728 McMaster. The heated environment also makes it more difficult to change molds between different production runs that cannot utilize the same molds. See U.S. Pat. No. 5,137,561 Schnabel, Jr. which discloses changing a cloth ring on a glass sheet heating furnace.

After forming, heat strengthening or tempering can be performed by rapid cooling at a quench section between lower and upper quench modules thereof and may have provision for transferring the glass sheet during such cooling by blowing a greater amount of gas upwardly so as to permit the associated quench ring that carries the glass sheet to move back to the heated forming station in preparation for the next cycle. See U.S. Pat. No. 4,361,432 McMaster et al.

All of the above cited patents are hereby incorporated by reference.

DISCLOSURE OF INVENTION

One object of the present invention is to provide an improved glass sheet forming and quench system including a quench loader for loading and unloading a set of lower and upper quench modules.

In carrying out the above object, the glass sheet forming and quench system includes a forming station for forming the glass sheets and also includes a quench station located adjacent the forming station and including lower and upper supply ducts for providing pressurized air flow. A quench shuttle of the quench station moves a quench ring between the forming station where a heated and formed glass sheet is received thereby and the quench station for quenching of the formed glass sheet. A quench loader of the system includes a quench carriage having a pair of spaced sides and an end that extends between the sides thereof to define a horizontally opening U shape that receives a set of lower and upper quench modules. The quench carriage includes mounts for mounting the set of lower and upper quench modules within its U shape for movement to the quench station to permit use thereof with the lower and upper supply ducts. The carriage permits subsequent movement of the set of lower and upper quench modules thereon from the quench station to permit use of another set of lower and upper quench modules in the quench station.

In the preferred construction of the system, the quench loader includes an overhead crane that supports the quench carriage. The system also includes an overhead railway along which the crane moves to move the quench carriage and the set of lower and upper quench modules mounted thereby to and from the quench station. The mounts of the quench carriage are located on the sides of the quench carriage, and each side of the quench carriage preferably includes lower and upper mounts for respectively mounting the lower and upper quench modules. More specifically, the lower mounts are embodied by hooks and the upper mounts are embodied by pads. Furthermore, the hooks are preferably mounted on the sides of the quench carriage for horizontal movement that facilitates the installation procedure.

Each side of the quench carriage includes a stop for engaging the quench module set to provide positioning of the quench carriage with respect to the quench modules.

The glass sheet forming and quench system also includes an elongated heating furnace having a primary axis along which the glass sheets are conveyed for heating. The forming station is located in alignment with the heating station along the primary axis, and the quench station extends from the forming station in a transverse direction with respect to the primary axis. A quench railway of the system includes a pair of spaced rails that extend from the forming station on opposite sides of the supply ducts. At least one of the rails is movable from a use position where the shuttle is supported for movement between the forming station and the quench station. The one rail is mounted for movement from the use position to the idle position spaced from the forming station. An actuator preferably moves the one rail between the use and idle positions, and this actuator is preferably embodied by a rack secured to the one rail and a pinion meshed with the rack and rotatable to move the associated rail between the use and idle positions. The actuator also includes a manual crank for rotating the pinion.

In the preferred construction, the other rail is also movable between a use position adjacent the forming station and an idle position spaced from the forming station so that the quench modules are accessible from both sides as necessary. Each rail includes an actuator for providing movement thereof between the use and idle positions, and each actuator includes a rack secured to its rail and a rotatable pinion meshed with the rack thereof and rotatable to move its rail between the use and idle positions. A manual pinion crank provides the pinion rotation.

Another object of the invention is to provide an improved method for installing a set of lower and upper quench modules in a glass sheet quench station.

In carrying out the above object, the method is performed by mounting the set of lower and upper quench modules within a horizontally opening U-shaped quench carriage. The quench carriage is then moved with the set of lower and upper quench modules mounted thereon to the quench station between lower and upper pressurized air supply ducts. The lower and upper quench modules are then transferred from the quench carriage for mounting in the quench station in respective communication with the lower and upper pressurized air supply ducts.

In the preferred practice of the method, lower and upper mounts of the quench carriage are respectively engaged with the lower and upper quench modules to provide the mounting thereof on the quench carriage. A shuttle rail of the quench carriage is moved from a use position to an idle position to permit the installation of the set of lower and upper quench modules and is subsequently moved back to the use position to permit operation of a quench shuttle. During the quench module installation, keys and keyways align the lower and upper quench modules with respect to the lower and upper pressurized air supply ducts. The keyways are adjusted upon the initial installation to align the quench modules and the supply ducts.

BRIEF DESCRIPTION OF THE DRAWINGS

FIG. 1 is a schematic top plan view of a glass sheet processing system that embodies the present invention.

FIG. 2 is a schematic elevational view taken along the direction of line 2—2 in FIG. 1 to illustrate the operation of a forming station and a quench station of the system.

FIG. 3 is a schematic view taken along the direction of line 3—3 in FIG. 1 to illustrate the commencement of a glass sheet forming cycle as an upper mold is moved downwardly to adjacent a heating conveyor to receive a heated glass sheet therefrom for the forming.

FIG. 4 is a schematic view of the forming apparatus similar to FIG. 3 but at a later stage of the cycle after the upper mold has been moved upwardly and a lower mold has been moved horizontally on a lower mold shuttle to below the upper mold and then transferred to a lower mold support assembly in preparation for the forming.

FIG. 5 is a schematic view of the forming apparatus similar to FIG. 4 but at a still later stage of the cycle after the upper mold has been moved downwardly to the lower mold to provide press forming therebetween of the glass sheet.

FIG. 6 is a schematic view of the forming apparatus at a still later stage of the cycle where the upper mold has been moved upwardly and a quench ring has been moved below the upper mold to receive the formed glass sheet therefrom in preparation for movement to a quench station for quenching.

FIG. 7 is a partially broken away perspective view that illustrates a glass sheet heating furnace of the system by phantom line representation and also illustrates the forming station and the quench station.

FIG. 8 is a top plan view taken along the direction of line 8—8 in FIG. 2 and from the left toward the right illustrates the lower forming mold, the upper forming mold which is shown by phantom line representation, and a quench shuttle that supports the quench ring.

FIG. 9 is an elevational view taken along the direction of line 9—9 in FIG. 8 to further illustrate the lower mold, the upper mold, and the quench shuttle that carries the quench ring.

FIG. 11a is an elevational view of another embodiment of the lower mold support assembly which is shown as including a pad on which the lower mold is supported during the forming cycle.

FIG. 12 is an elevational view taken in the same direction as FIG. 9 but illustrating the upper and lower molds during press forming of the glass sheet.

FIG. 12a is a sectional view taken along the direction of line 12a—12a in FIG. 12 to illustrate an insulated tubular construction of the lower mold shuttle.

FIG. 13 is a view also taken in the same direction as FIG. 9 to illustrate the manner in which the quench shuttle moves to below the upper mold at a later stage of the cycle to receive the formed glass sheet in preparation for movement to the quench station.

FIG. 17a is a view of an alternate embodiment of the detachable connectors embodied by removable retainers.

BEST MODES FOR CARRYING OUT THE INVENTION

Figure 10:
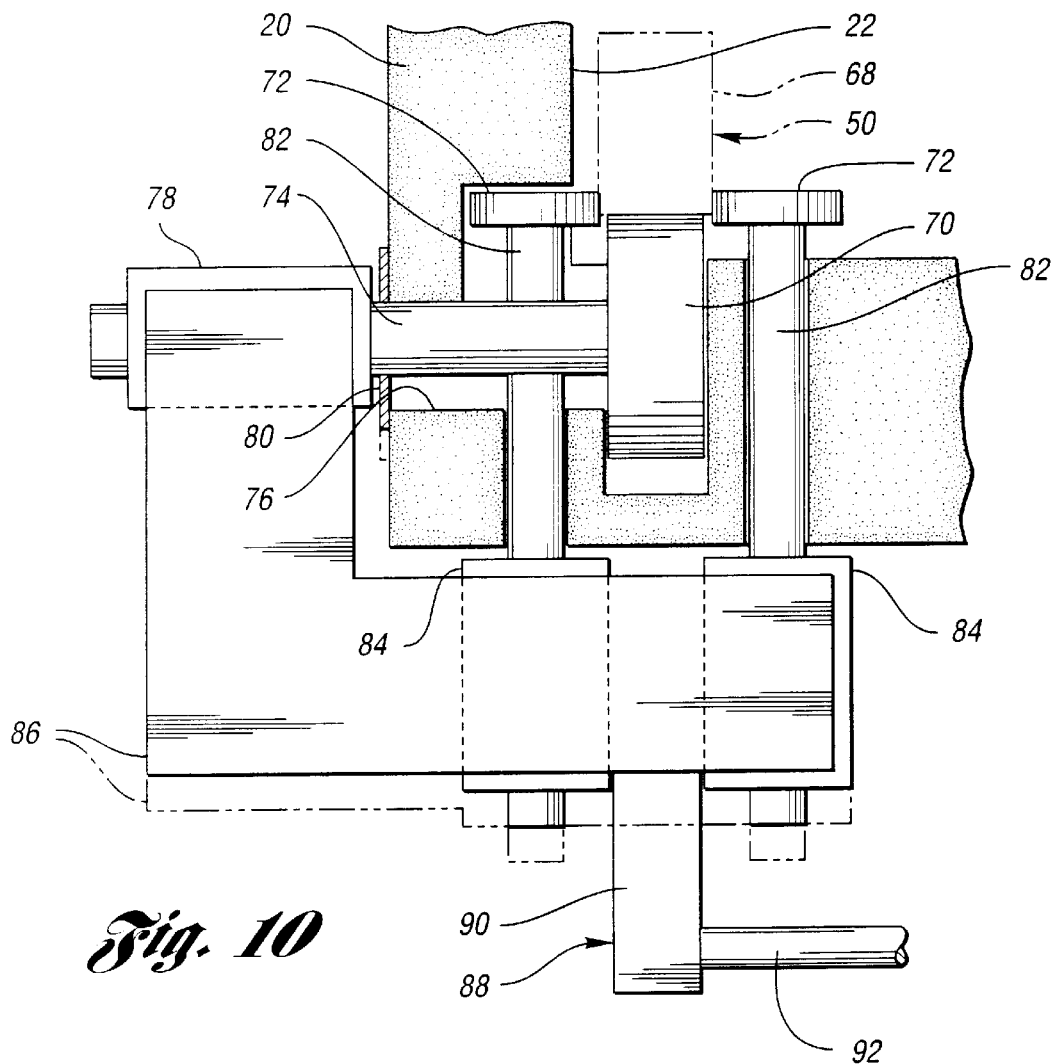
FIG. 10 is an elevational view taken in section along the direction of line 10—10 in FIG. 9 to illustrate a roller and horizonal positioners that support one side of a lower mold shuttle that moves the lower mold horizontally during the forming cycle.

With reference to FIG. 1 of the drawings, a glass sheet forming and quench system embodying the invention is generally indicated by 10 and will be summarily described before a detailed description of each station, apparatus, and method of operation utilized to perform the forming and quenching of glass sheets. System 10 includes an elongated furnace 12 in which glass sheets are heated during movement along a primary system axis A, which movement is also referred to as a direction of conveyance through the system. The conveyance within the furnace 12 may be on a roll conveyor 14 that includes rolls 16 as illustrated in FIGS. 2–7. As specifically shown in FIG. 7, the glass sheets are introduced into the system 10 at a loading table 18 for movement into a system housing 20 that defines a heated chamber 22 as shown in FIGS. 2–6.

With continuing reference to FIG. 1, the glass sheets after heating to forming temperature are moved to the right to a forming station 24 that includes apparatus 26 for cyclically forming the glass sheets as is hereinafter more fully described. This apparatus 26 includes an upper mold support assembly 28 and also includes a support and actuating mechanism 30 that moves the upper mold support assembly vertically during the forming operation. In addition, the system includes apparatus 32 for changing a heated mold used in the glass sheet forming operation. A mold assembly 34 utilized in the forming operation can be changed by the mold changing apparatus 32 as more specifically shown in FIG. 17 and includes a lower mold 36 and an upper mold 38 that are both changed at the same time. More specifically, after removal of a heated mold assembly 34 including lower and upper molds 36 and 38, another preheated mold assembly 34' having lower and upper molds 36 and 38 can be installed in the system as is hereinafter more fully described.

Figure 25:
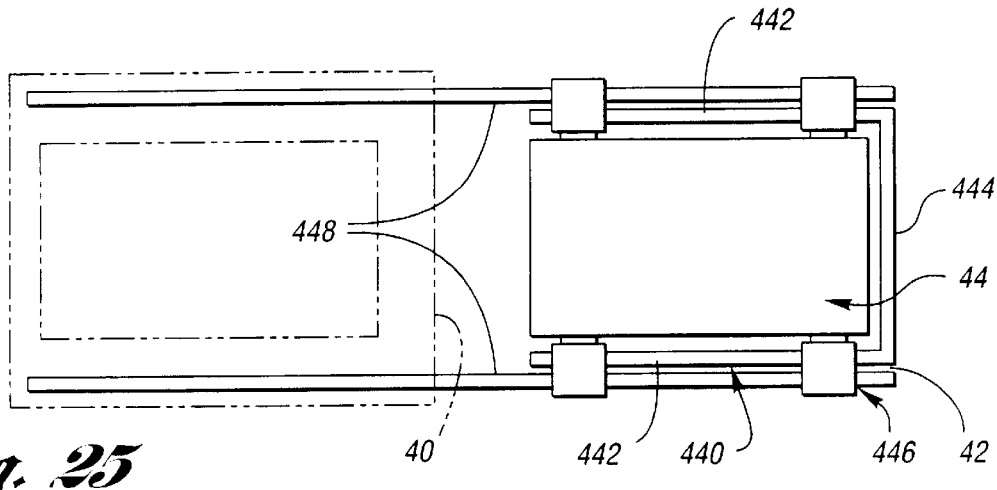
FIG. 25 is a top plan view that illustrates a quench loader utilized to change a set of lower and upper quench modules of the quench station.
Figure 26:
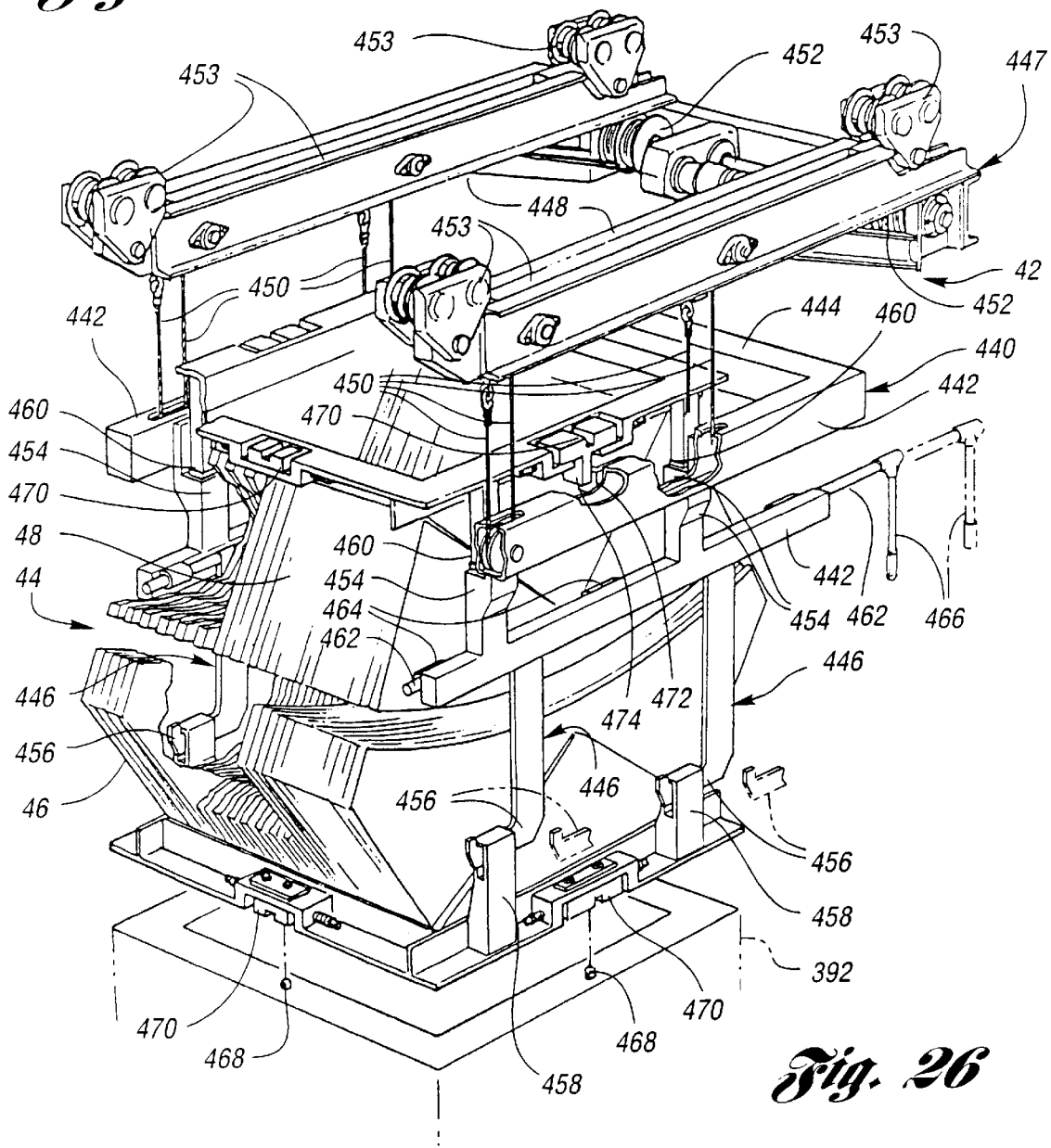
FIG. 26 is a perspective view illustrating the quench loader.

System 10 illustrated in FIGS. 1 and 2 includes a quench station 40 for quenching the formed glass sheets. This quench station, as also shown in FIGS. 25 and 26, includes a quench loader 42 that loads and unloads a quench module set 44. More specifically, the quench loader 42 is operable to provide the loading and unloading of the quench module set 44 which includes a lower quench module 46 and an upper quench module 48 that are spaced from each other in an opposed relationship during use to cooperatively provide both upwardly and downwardly directed quenching gas that rapidly cools and tempers a formed glass sheet as is hereinafter more fully described.

Figure 14:
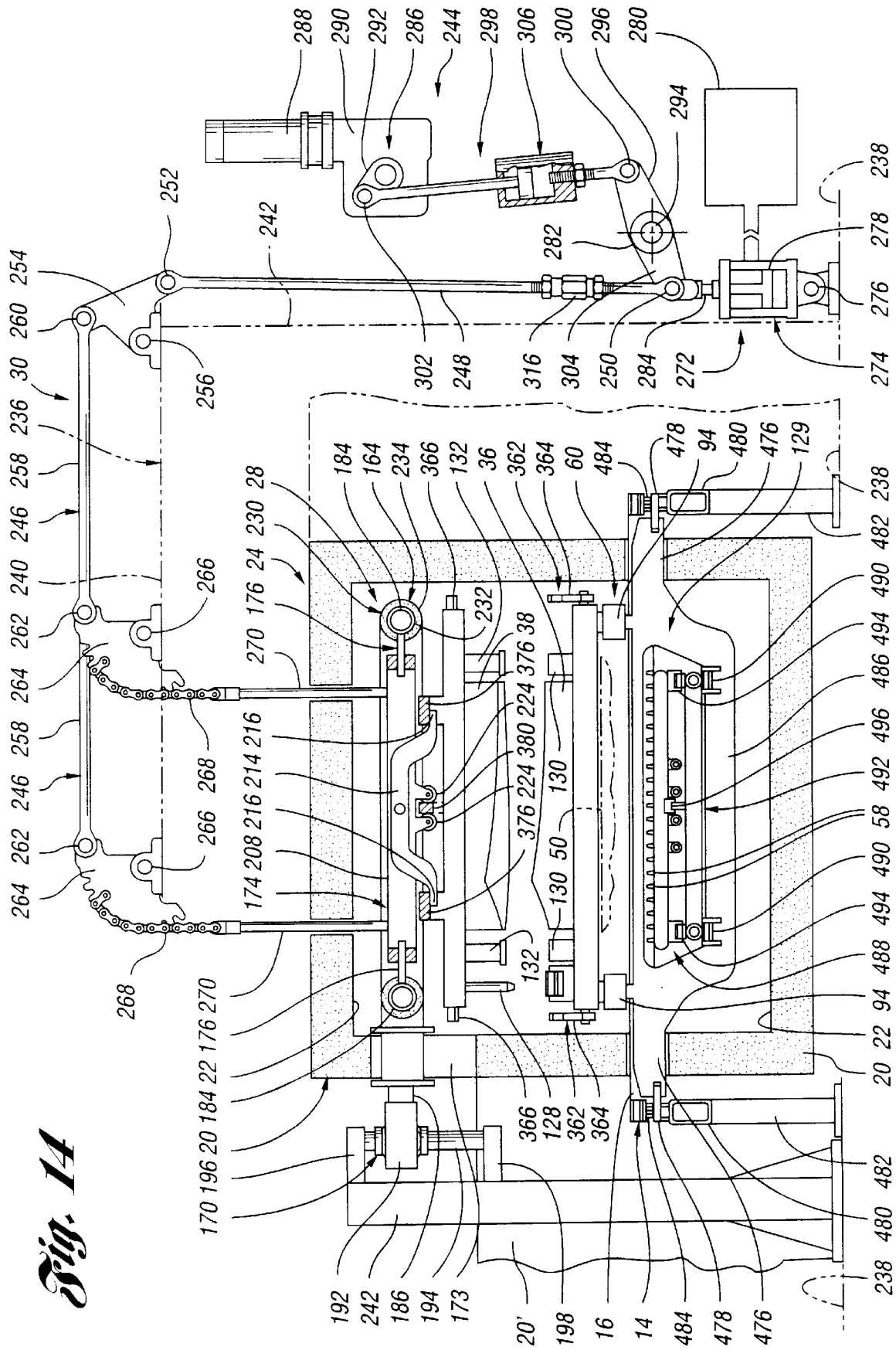
FIG. 14 is a sectional view taken along the direction of line 14—14 in FIG. 4 to illustrate the forming apparatus, the lower mold support assembly, an upper mold support assembly, and a support and actuating mechanism for the upper mold support assembly.

With reference to FIGS. 2–6, the forming station 24 and quench station 40 will be described in connection with their schematic illustration to facilitate an understanding of the method of operation of the system prior to a more complete integrated description of the apparatus and method of operation in connection with the other drawings. As shown in FIG. 2, the forming apparatus 26 of the forming station 24 is located within the heated chamber 22 of the system housing 20. More specifically, the upper mold support assembly 28 supports the upper mold 38 for vertical movement above the roll conveyor 14. The forming apparatus 26 also includes a lower mold shuttle 50 for supporting the lower mold 36 for movement at an elevation above the heating conveyor 14 between an idle position shown by solid line representation spaced horizontally from the upper mold 38 and a use position below the upper mold as shown by phantom line representation. In the idle position, the lower mold is located within a lateral extension 20' of the system housing as shown in FIG. 14, which lateral extension is referred to as the "hot box".

An initial cycle of the glass forming operation begins with the lower mold shuttle 50 positioning the lower mold 36 in its solid line indicated idle position and, as shown in FIG. 3, the upper mold support assembly 28 moves the upper mold 38 downwardly into proximity with a heated glass sheet G received under the upper mold on the rolls 16 of the conveyor 14. A vacuum generator 54 then draws a vacuum at a downwardly facing surface 56 of the upper mold 38 and gas jet pumps 58 below the conveyor 14 blow heated gas upwardly between the rolls 16 to provide a differential gas pressure that transfers the glass sheet to the upper mold 38.

The glass forming cycle continues as shown in FIG. 4 as the support and actuating mechanism 30 moves the upper mold support assembly 28 upwardly to thus move the upper mold 38 and the glass sheet G supported thereby to an upper position spaced above the conveyor 14. The lower mold shuttle 50 then moves the lower mold 36 from its idle position shown by solid line representation in FIG. 2 to its use position shown by phantom line representation and illustrated schematically also in FIG. 4 below the upper mold 38. In this use position, the support of the lower mold 36 is transferred from the lower mold shuttle 50 to a lower mold support assembly 60 as is hereinafter more fully described. While supported on the lower mold support assembly 60, the lower mold 36 can move horizontally as necessary for alignment with the upper mold 38 as the upper mold support assembly 28 moves the upper mold downwardly to the position of FIG. 5 where the glass sheet G is formed between the lower and upper molds 36 and 38. After such forming, the upper mold support assembly 28 moves the upper mold 38 upwardly and the lower mold 36 is transferred from the lower mold support assembly back to the lower mold shuttle 50 for movement from the use position under the upper mold 38 back to the idle position. At the same time, a quench shuttle 62 of the quench station 40 shown in FIG. 2 is moved by an actuator 64 to move a quench ring 66 on the quench shuttle to a transfer position below the upper mold 38 as shown in FIG. 6. The upper mold 38 is then moved downwardly to the quench ring 66 and the vacuum generator 54 then terminates the vacuum drawn at the downwardly facing surface 56 of the upper mold 38 and preferably also concomitantly provides a pressurized downward gas flow at that surface so as to release the formed glass sheet onto the quench ring 66. The actuator 64 of the quench shuttle 62 shown in FIG. 2 then moves the quench ring 66 from the forming station 26 back to the quench station 40 for quenching of the formed glass sheet between the lower and upper quench modules 46 and 48.

As shown in FIG. 8, the lower mold shuttle 50 includes a pair of spaced shuttle members 68 that are, as shown in FIGS. 9, 10, and 12, supported by associated vertically movable rollers 70. These rollers have an upper position that supports the members 68 of the lower mold shuttle 50 during the movement of the lower mold between the idle and use positions as previously described in connection with FIG. 2. The rollers 70 also have a lower position at which the lower mold shuttle 50 is moved downwardly with the lower mold 36 in the use position to provide the transfer of the lower mold to the lower mold support assembly 60.

As best shown in FIG. 10, the forming apparatus also includes horizontal positioners 72 that cooperate with the rollers 70 to support and guide the shuttle members 68 of the lower mold shuttle 50 during the movement of the lower mold between the idle and use positions. More specifically, each roller 70 has a horizontal shaft 74 that extends outwardly from the heated chamber through a vertical slot 76 in the system housing 20 and is supported by an associated bearing 78. A seal 80 on each roller shaft 74 moves vertically with the roller and seals the housing slot 76. Furthermore, each horizontal positioner 72 is embodied as a rotatable positioner having a vertical shaft 82 that extends downwardly through the floor of the system housing 20 so as to project outwardly from the heated chamber where an associated bearing 84 provides its rotatable support. The shafts 74 and 82 may be hollow and have end couplings that are connected to a liquid coolant hose so as to prevent excessive heating. Each of the bearings 78 and 84 is supported by a common mount 86 that is moved vertically by a cam mechanism 88 to provide the vertical movement of the rollers 70 as well as providing vertical movement of the horizontal positioners 72. More specifically, the cam mechanism 88 includes a cam 90 that moves the mount 86 vertically and also includes a cross shaft 92 that connects the cams associated with each of the pair of rollers 70 respectively associated with the pair of spaced shuttle members 68 of the lower mold shuttle 50. A suitable rotatable actuator rotates the cross shaft 92 to move the cams 90 and the associated rollers 70 and horizontal positioners 72 vertically for the transfer of the lower mold between the lower mold shuttle 50 and the lower mold support assembly as previously described.

Figure 11:
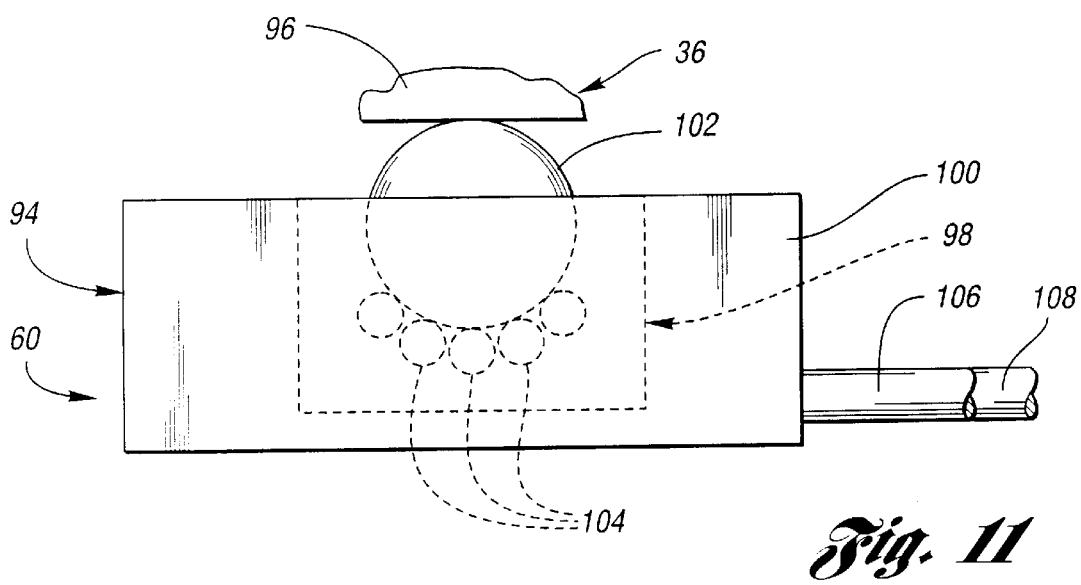
FIG. 11 is an elevational view that illustrates a lower mold support assembly shown in this embodiment as a ball transfer including a ball on which the lower mold is supported during the forming.

With reference to FIGS. 8, 9, and 12, the lower mold support assembly 60 includes four lower supports 94 for supporting the lower mold 36 adjacent the corner tabs 96 thereof as shown in FIG. 8. In one construction illustrated in FIG. 11, each lower mold support 94 is embodied by a ball transfer 98 having a housing 100 that supports a ball 102 by a ball track 104. A fluid inlet 106 and a fluid outlet 108 permit a liquid coolant to provide cooling so that the ball 102 is liquid cooled. In another construction illustrated in FIG. 11a, the lower support includes a pad 110 that supports the associated corner tab 96 of the lower mold 36. The housing 100 in this construction of the lower mold support also has a fluid inlet 106 and a fluid outlet 108 so that the pad 110 is liquid cooled. Preferably, the pad 110 is made from a carbon material. The use of the ball transfer 98 shown in FIG. 11 is preferable when it is desired for the lower mold 36 to move horizontally more easily, while the embodiment of FIG. 11a with the liquid cooled carbon pad 110 is useful in applications to prevent excessive horizontal lower mold movement.

As illustrated in FIGS. 8, 9, and 12, the lower mold shuttle 50 includes a lock 112 that secures the lower mold 36 against movement on the lower mold shuttle along its direction of travel during the movement between the idle and use positions. More specifically, the lock 112 includes a pair of lock rods 114 each of which has a ball socket connection 116 to an associated lower mold corner 96 and also has an end that extends through a hole in a tab 118 on the associated shuttle member 68. A lock member 120 pivotally mounted on each tab 116 also has a hole through which the associated lock rod 114 extends. An unshown actuator is connected to both lock members 120 to pivot the lock members between unlocked and locked positions. In the locked position, the lock members clamp against the lock rods 114 to prevent movement thereof and the connected lower mold on the lower mold shuttle along the direction of travel between the idle and use positions. The lower mold is locked against movement on the lower mold shuttle along the direction of travel as it moves between the idle and use positions. In the unlocked position, the hole of each tab 118 is aligned with the hole in the lock member 120 so as to permit movement of the lock rods 114 and hence movement of the lower mold 36 horizontally along the direction of travel between the idle and use positions, as previously described. Furthermore, in the unlocked position, the ball and socket connections 116 permit horizontal movement of the lower mold 36 in a transverse direction to the direction of movement between the idle and use positions. The lower mold 36 is thus then free to move horizontally on the lower mold support assembly for alignment adjustment in the use position as the upper mold 36 is moved downwardly as illustrated in FIG. 12. It should be noted that the ball and socket connection 116 is open on its upper side to permit detachment of the rods 114 from the lower mold 36 for mold changing as is hereinafter more fully described.

With combined reference to FIGS. 1, 8, 9 and 12, the lower and upper molds 36 and 38 have a longitudinal alignment guide, collectively indicated by 122, and have a pair of lateral alignment guides, collectively indicated by 124. Each of these alignment guides 122 and 124 as shown at FIGS. 8 and 9 includes a pair of spaced rollers 126 on the lower mold 36 and also includes a downwardly projecting pin 128 on the upper mold 38. The rollers 126 of the longitudinal alignment guide 122 are positioned along axes that extend transverse to the primary system axis A so as to thus position the lower horizontal mold 36 longitudinally along the primary axis when the upper mold 36 is moved downwardly to the position of FIG. 12. In addition, as also shown in FIG. 8, the rollers 126 of the pair of lateral alignment guides 124 extend parallel to the system axis A such that downward movement of the upper mold 38 to the position of FIG. 12 causes the rollers 126 to receive the pins 128 and provide lateral positioning of the lower mold 36. This positioning of the lower mold 36 as necessary takes place with the lower mold 36 in the use position and supported by the lower mold supports 94 of the lower mold support assembly 36 previously described. Upon movement of the upper mold 38 to the lower position shown in FIG. 12, the lower and upper molds are aligned so as to ensure proper press forming of the heated glass sheet between the molds.

As illustrated in FIG. 8, the lower mold supports 94 of the lower mold support assembly 60 are spaced closer to each other than the lower mold shuttle members 68 which are thus located between the lower mold supports upon movement of the lower mold 36 on the lower mold shuttle 50 to the use position of FIG. 12 where the transfer takes place between the lower mold shuttle and the lower mold support assembly. Also, pairs of the lower mold supports 94 are mounted as shown in FIG. 14 on a support member 129 within the heated chamber 22 of the housing 20 as is hereinafter more fully described.

With continuing reference to FIGS. 8, 9, and 12, the lower mold 36 includes lower stops 130 and the upper mold 38 includes upper stops 132. More specifically, these stops 130 and 132 are located adjacent the four corners of the molds and engage each other as shown in FIG. 12 to ensure proper spacing between the molds in the lower position where the glass sheet is pressed. Thus, the stops prevent excessive pressure being applied to the glass sheet being formed.

With reference to FIG. 12a, the lower mold shuttle 50 has a tubular construction so as to permit liquid coolant to flow therethrough for cooling. This tubular construction of the lower mold shuttle 50 has an outer insulator 133 that maintains the mold shuttle at a lower temperature in cooperation with the coolant flow.

As illustrated in FIG. 8, the quench shuttle 62 that supports the quench ring 66 includes a pair of shuttle members 134 spaced from each other. These quench shuttle members 134 are supported for movement between the transfer and quench positions previously described in FIG. 2 in a manner that is hereinafter more fully described in connection with the description of the quench station 40. The quench ring 66 includes corner supports 136 that are supported by the shuttle members 134 of the quench shuttle 62. This support of the quench ring 66 permits horizontal alignment adjustment thereof with the upper mold 38 in a manner similar to the alignment adjustment previously described in connection with the lower mold 36. More specifically, the quench ring 66 and the upper mold 38 have a longitudinal alignment guide collectively indicated by 138 and also have lateral alignment guides collectively indicated by 140. The longitudinal alignment guide 138 of the quench ring 66 includes a pair of rollers 142 that rotate about axes transverse to the primary system axis A and also utilizes the same downwardly projecting pin 128 of the longitudinal alignment guide 122 of the upper mold 38 to provide longitudinal positioning along the primary system axis. The lateral positioning guides 140 of the quench ring 66 each include a pair of rollers 144 that rotate about axes parallel to the primary system axis A spaced transversely from the longitudinal alignment guide of the quench ring. The lateral alignment guides 140 of the quench ring 66 also include downwardly projecting pins 146 on the upper mold 38 as shown in FIGS. 8 and 9 and these pins are received by its rollers 144 on the quench ring to provide lateral positioning of the quench ring when the upper mold 38 is moved downwardly as shown in FIG. 13 to receive a heated glass sheet from the upper mold as previously described.

As illustrated in FIGS. 8, 9, and 13, the quench shuttle 62 includes a lock 148 that prevents horizontal movement of the quench ring 66 on the quench shuttle during its movement between the transfer position illustrated in FIG. 6 and the quench position illustrated in FIG. 2. The lock 148 as shown in FIG. 8 includes a pair of lock rods 150 respectively associated with the pair of shuttle members 134 of the quench shuttle. Lock 148 also includes a pair of lock members 152 respectively supported by pivotal connections 154 on the pair of quench shuttle members 134. Each lock rod 150 has an end moved by a suitable actuator 156 that is preferably an air cylinder. A connection at 158 of each lock rod 150 receives one end 160 of the associated lock member 152 whose other end 162 is positioned over the adjacent corner support 136 of the quench ring 66. Actuators 156 pull on the lock rods 150 to pivot the lock members 152 counterclockwise and thereby provide a clamping lock of the associated quench ring corner support 136. This clamping lock prevents movement of the quench ring 66 on the quench shuttle 62 during its movement between the transfer and quench positions. In the transfer position illustrated in FIG. 13, each actuator 156 terminates its pull on the associated lock rod 150 such that the lock member 152 controlled thereby ceases the clamping of the associated quench ring support 136 in order to permit horizontal movement of the quench ring 66 on the quench shuttle as necessary for alignment of the quench ring with the upper mold 38 as the upper mold is moved downwardly to release the formed glass sheet onto the quench ring. Thereafter, the upper mold 38 moves upwardly and the locks 148 are again locked as the quench shuttle 62 moves the quench ring 66 from the transfer position to the quench position shown in FIG. 2 for the quenching of the glass sheet between the lower and upper quench modules 46 and 48.

With reference to FIG. 14, the upper mold support assembly 28 is shown mounted within the heated chamber 22 of the system housing 20 to provide support of the upper mold 38 that is used within this heated chamber to perform the glass sheet forming as previously described. This upper mold support assembly 28 includes a tubular support 164 that is collectively indicated by 164 and further illustrated also in FIGS. 15 and 16. The tubular support 164 includes a fluid inlet 166 and a fluid outlet 168 that permit flow of a liquid coolant through the tubular support to provide temperature control that reduces thermal expansion of the tubular support within the heated environment in which it is located. A vertical guide 170 is located externally of the heated chamber and has a vertically movable connection 172 to the tubular support 164 to permit vertical movement of the tubular support at a horizontally fixed location. The housing 20 includes a vertical slot 173 through which the connection extends to permit vertical movement.

Figure 15:
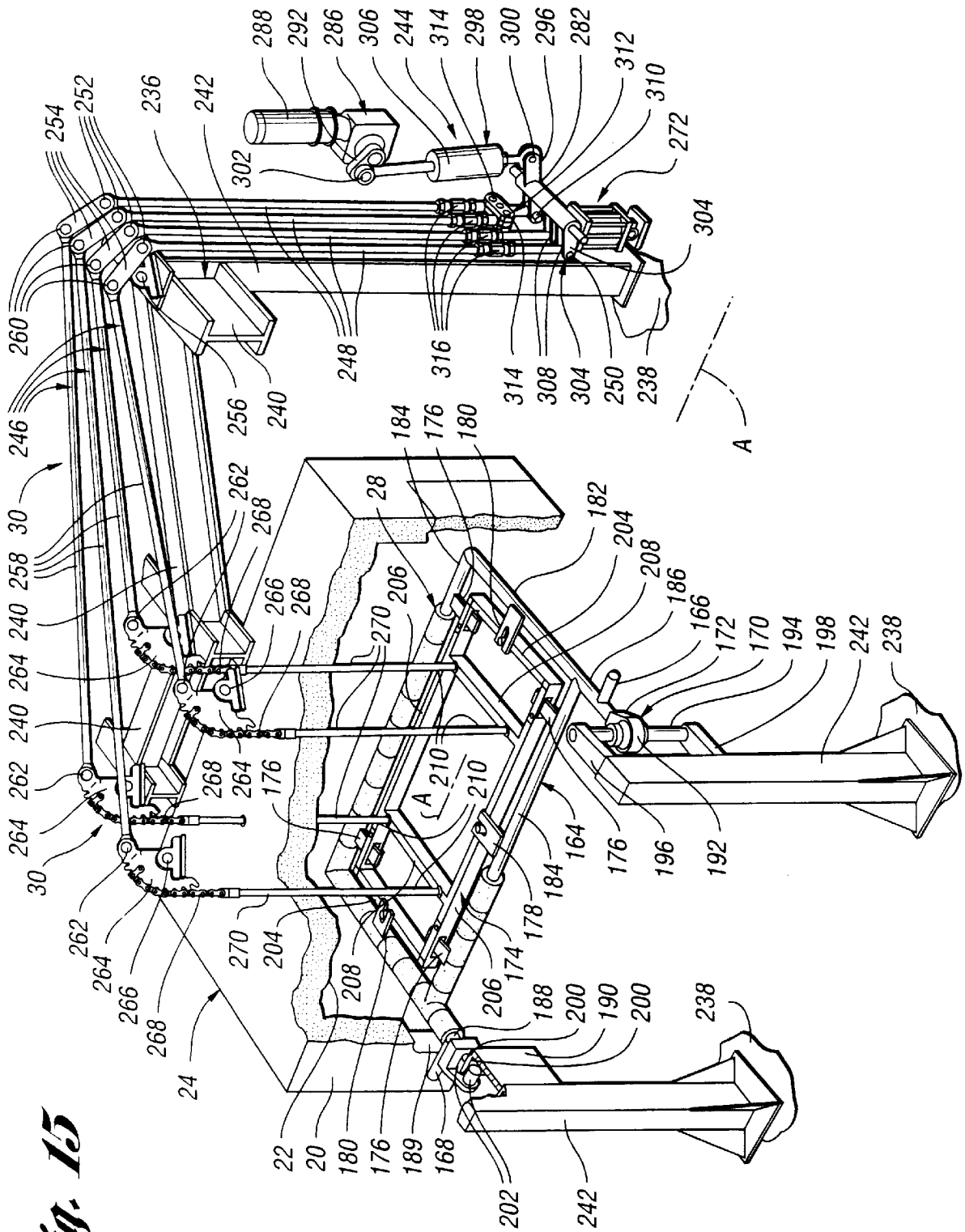
FIG. 15 is a partially broken away perspective view that illustrates the upper mold support assembly and its support and actuating mechanism.
Figure 16:
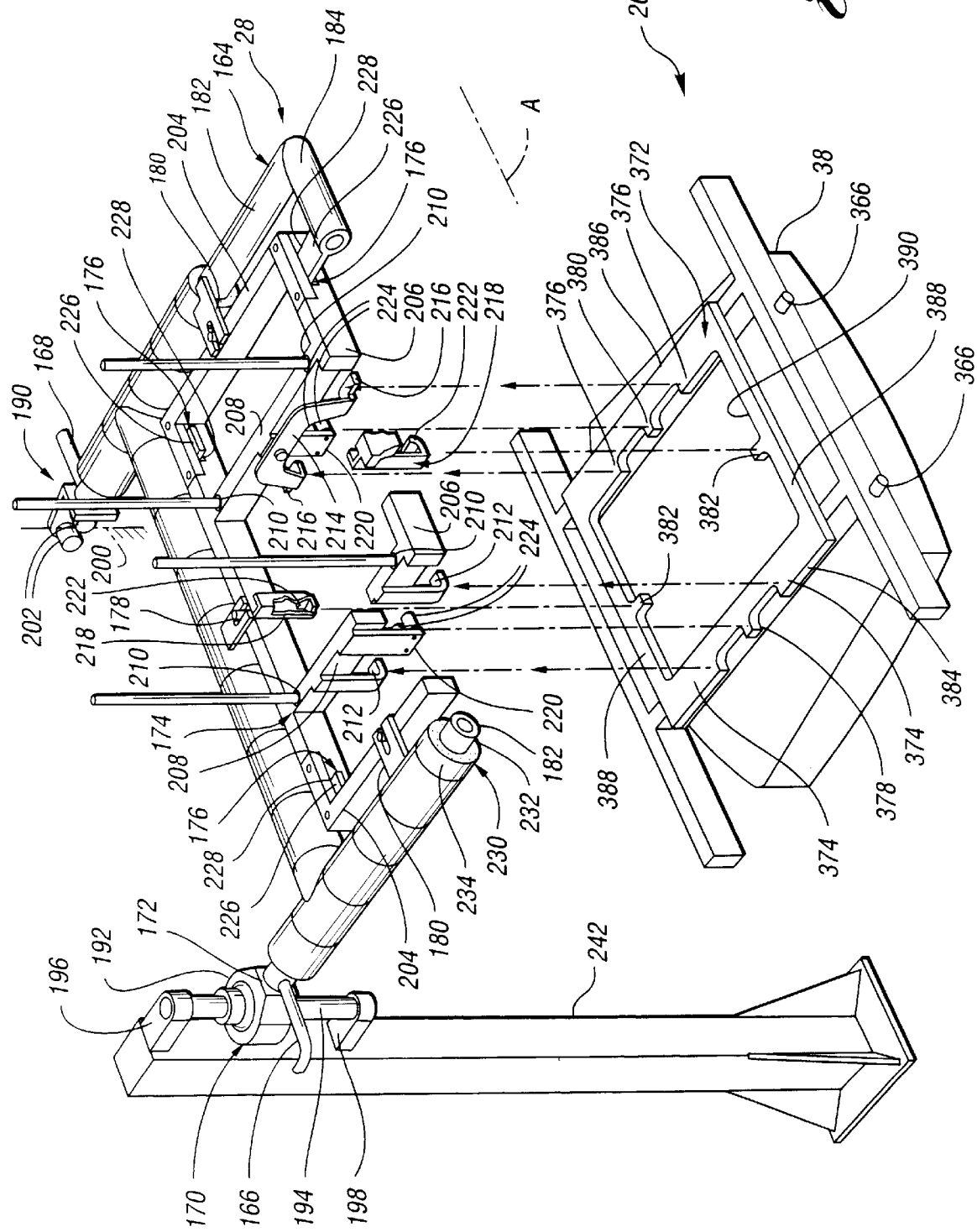
FIG. 16 is a partially broken away perspective view of the upper mold support assembly and also illustrates the upper mold and mounting guides utilized in supporting the upper mold.

A mold support 174 of the upper mold support assembly 28 is illustrated in FIGS. 14–16 and supports the upper mold 38 that provides the forming of the hot glass sheets in a cyclical manner as previously described. Support mounts 176 support the mold support 174 on the tubular support 164. A longitudinal positioner 178 and a pair of lateral positioners 180 locate the mold support 174 with respect to the tubular support 164 to provide a thermally stable center of the mold support. More specifically, the longitudinal positioner 178 provides positioning of the mold support 174 along the primary system axis A while the lateral positioners 180 provide positioning in a direction transverse to the primary axis A of the system. The longitudinal positioner 178 is located longitudinally at approximately the center of the supported upper mold 38 while the lateral positioners 180 are located laterally at the lateral center of the upper mold such that any thermal expansion takes place about a thermally stable center generally at the center of the mold.

As illustrated best in FIGS. 15 and 16, the tubular support 164 has a rectangular shape within which the mold support 174 is received. Likewise, the mold support 174 has a rectangular shape, as is hereinafter more fully described. The rectangular tubular support 164 includes a pair of end tubes 182, one of which is communicated with the fluid inlet 166 and the other of which is communicated with the fluid outlet 168. A pair of side tubes 184 of the tubular support extend between the pair of end tubes 182 thereof in a spaced relationship to each other to cooperate with each other and with the end tubes in defining the rectangular shape of the tubular support. The pair of end tubes 182 have a larger cross-sectional flow area than the pair of side tubes 184 to provide a generally uniform flow of liquid coolant through the tubes of the tubular support. More specifically, as illustrated, all of the tubes 182 and 184 of the tubular support have a round cross section. As shown in FIG. 15, one of the end tubes 182 includes an extension 186 that extends from the rectangular shape of the tubular support to the vertical guide 170 and the other end tube includes an extension 188 that extends through a vertical housing slot 189 to a lateral positioner 190 externally of the heated chamber 22 of the system housing 20.

The vertical guide 170, as shown in FIGS. 14–16, includes an antifriction bearing 192 movable along a vertical guide rod 194 that is fixedly mounted externally of the heated chamber by post-mounted upper and lower lugs 196 and 198.

The lateral positioner 190, as shown in FIGS. 15 and 16, includes a vertical positioning member 200 fixedly mounted externally of the heated chamber such as by a post-mounting as illustrated in FIG. 15. The lateral positioner 190 also includes a pair of spaced positioners 202 embodied by rollers mounted on the end tube extension 188 with the vertical positioning member 200 therebetween so as to provide positioning about a lateral direction with respect to the primary system axis A.

As best illustrated in FIGS. 15 and 16, the mold support 174 includes a pair of end members 204 and a pair of side members 206 that are connected to each other to define its rectangular shape. As previously mentioned, the tubular support 164 has a rectangular shape that receives the rectangular upper mold support 174.

As illustrated in FIG. 16, the upper mold support 174 also includes a pair of cross members 208 extending between the side members 206 thereof in a parallel relationship to the end members 204. The cross members 208 have support connections 210 for supporting the upper mold support 174 in a suspended manner from the support and actuating mechanism 30, as is hereinafter more fully described. One of the cross members 208 includes a pair of mold mounts 212 fixed thereto to mount the upper mold 38 as is hereinafter more fully described. These fixed mold mounts 212 have a generally L shape extending downwardly from the associated mold support cross member 208 with the lower foot thereof projecting along the primary system axis A along the direction of conveyance during the heating of the glass sheets. The other mold support cross member 208 includes a pivotally mounted yoke 214 having a pair of mold mounts 216 spaced laterally from each other along the primary system axis A. Furthermore, each side member 206 includes a mold mounting guide 218 and each cross member 208 includes a mold mounting guide 220. More specifically, the mold mounting guide 218 of each side member 206 includes a guide ramp 222 and each mold mounting guide 220 of each cross member 208 includes a pair of guide rollers 224.

The mold mounts 212 and 216 cooperate with the mold mounting guides 218 and 222 to provide mounting of the upper mold 38 of the mold assembly 34 shown in FIG. 17 in a manner that is hereinafter more fully described in connection with the description of the mold assembly and the mold changing.

With reference to FIG. 16, each support mount 176 includes a spade 226 that extends inwardly from the tubular support 164 adjacent one of its corners and as shown from the adjacent end of the side tube 184. Each support mount 176 also includes an opening 228 in the mold support 174 likewise adjacent one of its corners and as shown on one of the side members 206. The openings 228 receive the spades 226 to provide the mounting of the mold support 174 on the tubular support 164 while permitting horizontal positioning movement with respect thereto under the operation of the positioners 178 and 180 previously described. These positioners 178 and 180 as illustrated comprise pin and slot positioners that extend between the tubular support 164 and the mold support 174 with the longitudinal positioner 178 fixing the longitudinal center of the mold support 174 along the primary system axis A and with the lateral positioners 180 fixing the lateral center of the mold support transverse to the system axis A.

As illustrated in FIGS. 14–16, the tubular support 164 includes an outer insulator 230 that includes an inner layer 232 of ceramic fiber and an outer metallic reflective layer 234.

With reference to FIGS. 7, 14 and 15, the support and actuating mechanism 30 for the upper mold support assembly 28 is illustrated as including a framework 236 mounted on the factory floor 238 and including horizontal beams 240 extending over the system housing as well as including vertical posts 242 that support the horizontal beams on the floor. An actuator 244 of the support and actuating mechanism 30 is mounted adjacent one of the vertical posts 242 adjacent the factory floor 238 so as to be conveniently accessible. Furthermore, a plurality of connectors 246 extend from the actuator 244 to the upper mold support assembly 28 at the spaced locations provided by the support connections 210 previously described.

As best illustrated by combined reference to FIGS. 14 and 15, each connector 246 of the upper mold support and actuating mechanism 30 includes a vertical connector rod 248 having a lower end including a connection 250 to the actuator 244 and having an upper end including a connection 252 to an upper pivot link 254 mounted on the framework 236 by a pivotal mount 256. Each connector 246 also includes a horizontal connector rod 258 having one end connected to the associated upper pivotal link 254 by a pivotal connection 260. Each horizontal connector rod 258 also has another end including a pivotal connection 262 to a sector wheel 264, and each sector wheel 264 has a pivotal mount 266 on the framework 236. Each connector 246 includes a flexible member 268 extending from the associated sector wheel 268, and each connector also includes a vertical mold rod 270 depending from the flexible member thereof and connected to the upper mold support assembly 28 by the support connections 210 previously described. Operation of the actuator 244, as is hereinafter more fully described, causes the mechanism 30 to move the upper mold support assembly 28 vertically to provide the glass sheet forming operation previously described.

As shown in both FIGS. 14 and 15, the sector wheel 264 of each connector 246 is preferably a sector sprocket and the flexible member 268 thereof is a chain that is received by teeth of the sprocket. Operation of the actuator 244 that moves each connector 246 thus rotates the sector sprocket 246 to move the flexible chain 268 and thereby move the associated mold rod 270 upwardly or downwardly to likewise move the upper mold support 28 vertically.

As illustrated in FIG. 14, the actuator 244 includes a counterbalance 272 for counterbalancing the weight of the upper mold support assembly 28 and the upper mold 38 supported thereby for the glass forming operation. This counterbalance 272 includes a gas cylinder 274 that has a connection 276 to the factory floor 238. A piston 278 of the cylinder 274 is biased by pressurized gas supplied by a pressurized gas reservoir 280 so as to be urged in a downward direction. Furthermore, a lever 282 of the actuator 244 is secured by the connections 250 to the connectors 246 and to a connecting rod 284 of the piston 278 so as to thus be connected to the counterbalance 272 for the counterbalancing operation. The volume of the pressurized gas reservoir 280 is on the order of 20 times or so the volume of the gas cylinder 274 so that movement of the piston does not substantially change the magnitude of the counterbalance bias.

As illustrated in both FIGS. 14 and 15, the actuator 244 also includes a rotary drive 286 having a drive motor 288 that drives a gear box 290 having a rotary output 292. With continuing reference to FIG. 14, the lever 282 has a central portion including a pivotal mount 294. The lever 282 also has a first end 296 connected to the rotary drive 286 at its output 292 by a drive connector 298. More specifically, the drive connector 298 has a connection 300 to the first lever end 296 and has a connection 302 to the rotary drive output 292. Furthermore, the lever 282 has a second end 304 connected to the connectors 246 and to the counterbalance 272 by the connections 250.

As illustrated best in FIG. 14, the drive connector 298 includes an overtravel connection 306 that connects the rotary drive 286 at its output 292 with the first end 296 of the lever 282. This overtravel connection 306 permits the rotary drive 286 to move the mold support assembly 28 downwardly to the lower position intended while permitting the rotary drive to overtravel to ensure that the mold support assembly is in the lower position.

As best illustrated in FIG. 15, there are four of the connectors 246 extending between the actuator 244 and the upper mold support assembly 28. The second lever end 304 has two legs 308 secured by the connections 250 directly to the lower ends of two of the vertical connector rods 248 of two of the connectors 246. Another portion 310 of the second lever end 304 is secured by the pivotal connection 250 to a pivotal yoke 312 that has pivotal connections 314 to the lower ends of the other two vertical connector rods 248 of the other two connectors 246. This yoke 312, in cooperation with the mold mounting yoke 214 previously described in connection with FIGS. 14 and 16, ensures that the four point connection of the upper mold operates in a three point connection manner so as to ensure proper mold support for the glass sheet forming. In this regard, each connector 246 includes an adjuster 316 for adjusting its length. More specifically, these adjusters 316 are threaded adjusters and are located along the vertical connectors rods 246 that extend upwardly from the actuator 244 to the upper pivot links 250. Furthermore, the adjusters 316 are preferably located adjacent the factory floor 238 so as to be conveniently accessible like the other components of the actuator 244.

Figure 17:
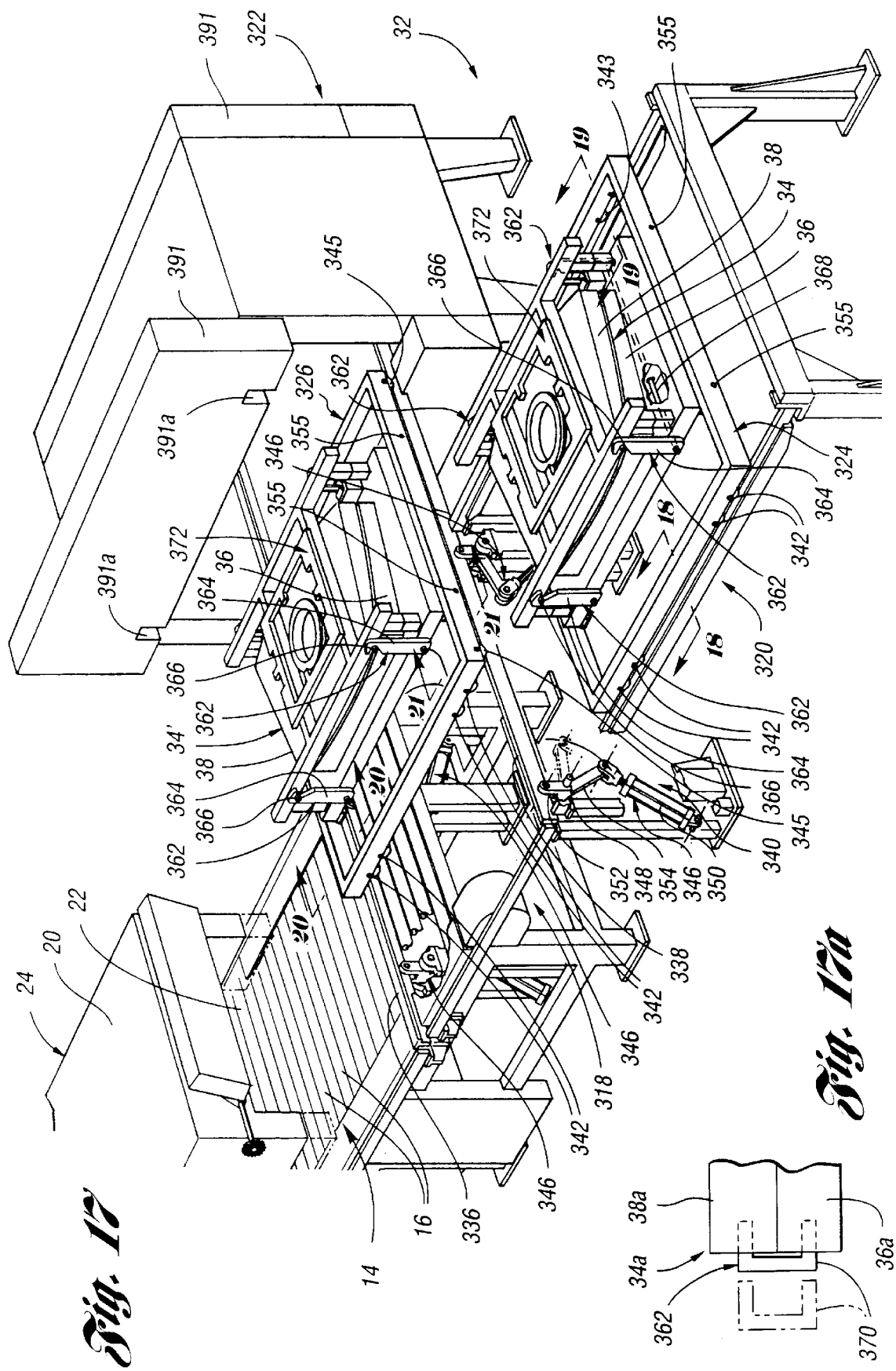
FIG. 17 is a perspective view of apparatus of the system for changing a mold assembly of the lower and upper molds which are secured to each other by detachable connectors embodied by latches.

With reference to FIG. 17, the mold changing apparatus 32, as illustrated, provides for changing of the mold assembly 34 that includes both the lower mold 36 and the upper mold 38 shown. However, it should be appreciated that this mold changing apparatus can be utilized to change only a single mold as well as a pair of molds although the changing of a pair of molds of the mold assembly is a use for which the apparatus has particular utility in the system involved. Also, the molds changed can be curved molds as illustrated for press bending and can also be a flat transfer mold for transferring the heated glass sheet during the forming process.

More specifically, the changing apparatus 32 is capable of removing a heated mold assembly 34 from the forming station 24 and replacing it with a preheated mold assembly 34' in order to terminate one production run and begin another. In this connection, the mold changing apparatus 32 includes a switching station that is generally indicated by 318 and located adjacent the forming station 24 at which the cyclical glass sheet forming takes place as previously described. An unloading station 320 of the mold changing apparatus 32 is located adjacent the switching station 318 as is a mold preheating station 322. An unloading cart 324 of the mold changing apparatus 32 is movable from the unloading station 320 to the switching station 318 and then to the forming station 24 to receive the mold assembly 34 by supporting the upper mold 38 thereof, as is hereinafter more fully described. The unloading cart 324 is subsequently moved from the forming station 24 back through the switching station 318 to the unloading station 320 to permit unloading of the mold assembly 34. A loading cart 326 supports and positions a second mold assembly 34' for heating within the mold preheating station 322 so that the molds thereof are heated to operating temperature prior to commencing the mold changing. After such heating, the loading cart 326 is movable to move the heated second mold assembly 34' from the mold preheating station 322 to the switching station 318 and then to the forming station 24 for loading of the second heated mold within the forming station by an installation process that is hereinafter more fully described.

With combined reference to FIGS. 1 and 17, the switching station 318 of the mold changing apparatus 32 is located downstream from the forming station 24 along the primary system axis A in the direction of conveyance of glass sheets within the heated chamber of the housing. Furthermore, the unloading station 320 is located downstream from the switching station 318 along the direction of conveyance along the system axis A. In addition, the mold preheating station 322 is located laterally with respect to the direction of conveyance from the switching station 318.

Figure 18:
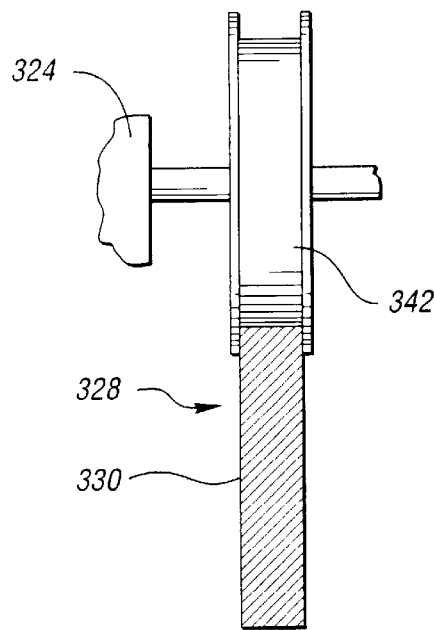
FIGS. 18 and 19 are respectively taken along the directions of lines 18—18 and 19—19 of FIG. 17 and illustrate rails of a primary railway of the mold changing apparatus.
Figure 19:
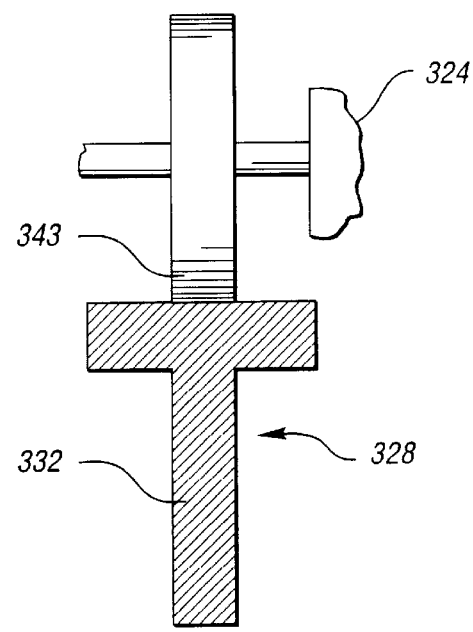

With combined reference to FIGS. 17, 18 and 19, the mold changing apparatus 32 includes a primary railway 328 having a pair of spaced rails 330 and 332 that extend along the direction of conveyance from the forming station 24 through the switching station 318 to the unloading station 320 to support the unloading cart 324 for movement between the unloading station and the forming station through the switching station and to support the loading cart 326 for movement between the switching station and the forming station. An auxiliary railway 334 of the mold changing apparatus extends laterally with respect to the direction of conveyance along the primary system axis A from the switching station 318 to the mold preheating station 322 and includes a pair of spaced rails 336 and 338. The auxiliary railway 334 also includes an actuator, collectively indicated by 340 in FIG. 17, that moves its spaced rails from a lower idle position shown by phantom line representation in FIGS. 20 and 21 to an upper use position shown by solid line representation to support the loading cart for movement between the mold preheating station and the switching station.

As illustrated in FIGS. 18 and 19, the unloading cart 324 includes a guiding wheel 342 supported by a rail that is a guiding rail 330 for preventing any lateral movement of the unloading cart with respect to the rail. The other associated rail 332 of the primary railway 328 has a T shape that supports another wheel 343 of the unloading cart 324. The wheels 342 and 343 thus provide movement of the unloading cart 324 along the primary railway 328 between the unloading station 324 and the forming station 24 through the switching station 318 for the mold unloading process. Loading cart 326 likewise has a set of wheels 342 and 343 for providing movement thereof along the primary railway 328 between the switching station 318 and the mold preheating station 322 with the rails 336 and 338 of the auxiliary railway 334 in their lower idle positions. The loading cart 326 also includes wheels 344 and 345 for moving along the rails 336 and 338 of the auxiliary railway 334. One of the wheels 345 is a guide wheel that moves along the guiding rail 338 and thus prevents any lateral movement of the loading cart 326 on the auxiliary railway 334. The other wheel 344 of the loading cart 326 moves along the T-shaped rail 336 of the auxiliary railway.

Figure 20:
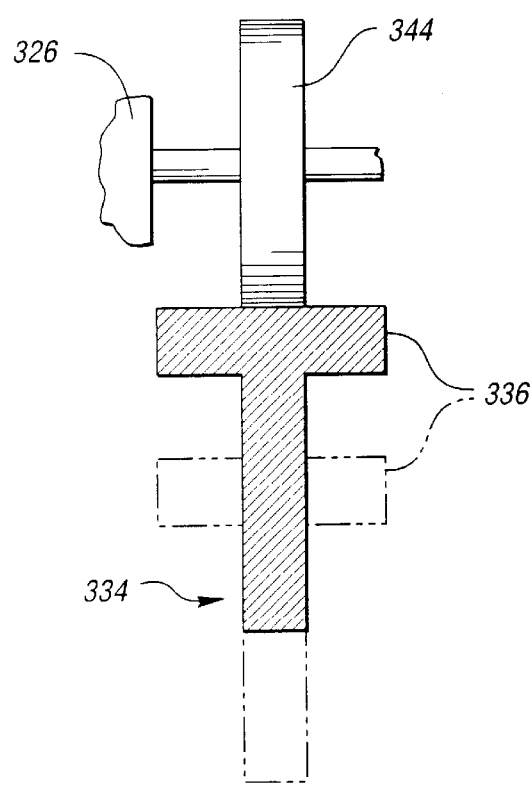
FIGS. 20 and 21 are respectively taken along the directions of lines 20—20 and 21—21 of FIG. 17 and illustrate rails of an auxiliary railway of the mold changing apparatus.
Figure 21:
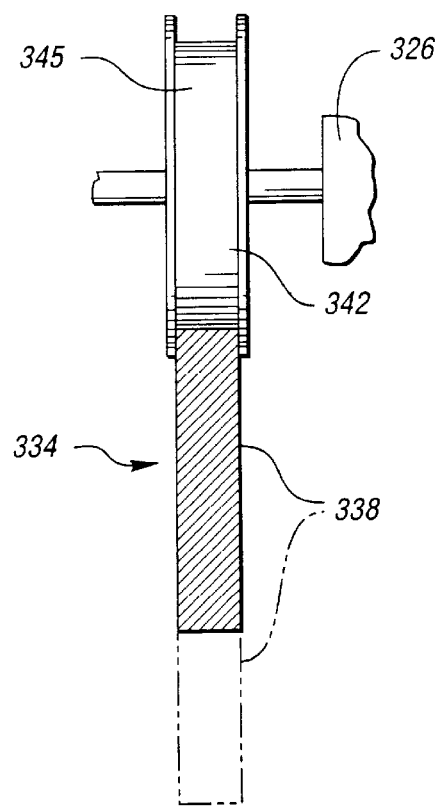

As illustrated in FIG. 17, the actuator 340 of the auxiliary railway 334 includes a pair of operators 346 for moving each of the rails 336 and 338 vertically between the idle and use positions shown by phantom and solid line representation in FIGS. 20 and 21. Each operator 346 includes a pivotal crank 348 and a cylinder 350. The pivotal crank 348 has a first arm 352 connected to the associated rail 336,338 and a second arm 354 connected to the cylinder 350. Extension and retraction of the cylinder 350 pivots the crank 348 to provide the movement of the associated rail 336,338 between the lower idle position and the upper use position. Thus, the rails 336 and 338 of the auxiliary railway 334 are positioned in their upper use positions shown by solid line representation in FIGS. 20 and 21 for the movement of the loading cart 326 between the mold preheating station 322 and the switching station 318. With loading cart 326 in the switching station 318, downward movement of the rails 336 and 338 to the idle positions transfers the loading cart to the primary railway 326 where its wheels 342 and 343 are supported by the rails 330 and 332 of the primary railway. The loading cart is then movable to the forming station 24 for loading installation of the mold assembly 34' after which it is moved back to the switching station. Both the unloading and loading carts 324 and 326 have unshown mold assembly supports that are secured by connectors 355.

Further description of the mold changing operation will await the following discussion of the mold assembly 34 shown in FIG. 17. The mold assembly 34, as previously described, includes a lower mold 36 and an upper mold 38. The lower mold 36, as shown in FIG. 8, has an upwardly oriented mold face that constitutes a press ring 356, while the upper mold 38, as shown in FIG. 9, has a downwardly oriented mold face that as disclosed has a full surface 56 including openings 360 through which a vacuum is drawn and through which positive pressure blow off air can be supplied as necessary. The upwardly oriented mold face of the lower mold 36 as provided by the press ring 356 shown in FIG. 8 and the downwardly oriented mold face of the upper mold 38 as provided by the full surface 56 shown in FIG. 9 oppose each other to form heated glass sheets during the movement of the molds toward each other as previously described in connection with the forming operation. Furthermore, the longitudinal alignment guide 122 and the lateral alignment guides 124 provided by the pins 128 and the rollers 126 as previously described align the molds with each other as necessary during downward movement of the upper mold 38 toward the lower mold 36 with the lower mold supported by the lower mold support assembly 60, as previously described and as is illustrated in FIG. 12. Furthermore, as illustrated in FIG. 17, detachable connectors 362 connect the molds 36,38 to each other to permit the lower mold to be suspended from the upper mold during installation within and removal from the glass sheet forming station 24. These connectors 362 disconnect the molds from each other during use in the forming of glass sheets in the glass sheet forming station 24, as previously described.

As illustrated in FIG. 17, the detachable connectors 362 comprise latches, each of which includes a latch member 364 pivotally mounted on one of the molds, the lower mold 36 as illustrated. Each latch also includes a keeper 366 mounted on the other mold, the upper mold 38 as shown. Each latch member 364 is movable in a pivotal manner between a latched position shown in FIG. 17 where the latch member secures the associated keeper 366 and an unlatched position as shown in FIG. 14 where the associated keeper is released so that the lower mold 36 is movable independently of the upper mold 38. As shown in FIG. 17, latch connections 368 extend between associated pairs of the latch members 364 to provide movement thereof with each other between the latched and unlatched positions.

As illustrated in FIG. 17a, another embodiment of the mold assembly 34a has the detachable connectors 362 embodied by retainers 370 that are positioned as shown by solid line representation in an engaged relationship with the lower and upper molds 36a and 38a to secure the molds to each other. These retainers 370 are removable from the molds 36a and 38a as shown by phantom line representation to release the molds from each other.

As illustrated in FIG. 16, the upper mold 38 includes a support plate 372 having mounting portions 374 and 376 for mounting the upper mold 38 for use on the upper mold support assembly 28 previously described. The support plate 372 of the upper mold 38 also has mounting guide portions 378, 380 and 382 for guiding the upper mold into position upon installation for use on the mold support 174 of the upper mold support assembly 28 previously described. More specifically, the upper mold support plate 372 includes ends 384 and 386 and a pair of sides 388 that extend between its ends to define a generally rectangular shape having an open center 390.

Each of the ends 384 and 386 of the upper mold support plate 372 has an associated pair of the mounting portions 374,376 and one of the mounting guide portions 378,380 located between the associated pair of mounting portions 374,376. The pair of mounting portions 374 and the mounting guide portion 378 on the one end 384 of the support plate 372 are exposed outwardly with respect to the rectangular shape of the support plate which is in an upstream direction with respect to the direction of system conveyance along its primary axis A. The pair of mounting portions 376 and the mounting guide portion 380 located therebetween on the other end 386 of the plate 372 are within the open center 390 of the rectangular shape of the support plate which also is in an upstream direction with respect to the direction of conveyance along the primary system axis A. Furthermore, each side 388 of the upper mold support plate 372 has one of the mounting guide portions 382 that is located within the open center 390 of the rectangular shape of the support plate.

With reference to FIGS. 14, 16 and 17, removal of a heated mold assembly 34 from the forming station 24 and installation of a second mold assembly 34' will now be described. It should be noted that before such mold changing commences, the second mold assembly 34' will have previously been positioned within the mold preheating station 322 as illustrated in FIG. 1 for heating to operating temperature in preparation for the mold changing. In the mold preheating station 322, the loading cart 326 projects outwardly from opposite sides of the preheating station through vertically movable doors 391 at lower openings 391a thereof as shown in FIG. 17. Thus, the loading cart wheels 342, 343, 344 and 345 are not continually heated as the mold assembly 34' is heated.

The mold changing operation begins with the lower mold 36 positioned below the upper mold 38, as shown in FIG. 14, and the upper mold is then moved downwardly so that lower and upper stops 130 and 132 engage each other as shown in FIG. 12. The detachable connectors 362 are then attached by pivoting movement of the latch members 364 to engage the keepers 366 so that the lower and upper molds 36 and 38 are secured to each other as the mold assembly illustrated in FIG. 17. The upper mold support assembly 28 shown in FIG. 16 is then moved upwardly to permit movement of the unoccupied unloading cart 324 shown in FIG. 17 from the unloading station 320 through the switching station 318 to the forming station 24 on the primary railway 328. The unloading cart is then positioned below the mold support assembly 28 shown in FIG. 16 and downward movement of the mold support assembly 28 then positions the mold assembly on the unloading cart. This downward movement of the mold support assembly 28 is then continued a slight extent until the mold mounts 212 and 216 move downwardly out of engagement with the mounting portions 376 and 378 of the upper mold support plate 372 and until the upper mold mounting guide portions 382 are positioned above the guide ramps 222 so that the unloading cart can then be moved downstream along the axis A just a slight extent toward the switching station. This initial downstream movement is just sufficient so that the mold support assembly 28 can be moved upwardly without the mold mounts 212 and 216 engaging the upper mold support plate 372. The upward movement is sufficient so that the upper mold 38 can then move farther downstream without interference from the mold mounts 216 and the adjacent guide rollers 224 on the downstream cross member 208 and without interference from the mold mounting guides 218 on the side members 206 of the mold support 174. The downstream movement of the unloading cart 324 then continues as previously described in connection with FIG. 17 along the primary railway 328 through the switching station 318 to the unloading station 320 for unloading.

After the mold removal from the forming station, the second mold assembly 34' is then moved from the preheating station 322 by the loading cart 326 on the auxiliary railway 334 to the switching station 318, illustrated best in FIG. 17. At the switching station 318, the unloading cart 326 is then switched to the primary railway 328 as previously described and moved upstream along the system axis A to the forming station 24.

Installation of the mold assembly 34' at the forming station 324 can best be understood by reference to FIG. 16 which illustrates the upper mold 38 to which the lower mold is then secured as previously described. The mold support assembly 28 is then positioned above the upper mold 38 so that the support plate 372 is free to move under the mold mounts 216 and the adjacent guide rollers 224 as well as under the mold mounting guides 218. This movement positions the mounting portions 374 and 376 as well as the mounting guide portions 382 just downstream from the associated mold mounts 212 and 216 and the mold mounting guides 218, respectively. Downward movement of the mold support assembly 28 a slight extent and a small movement of the loading cart upstream along the system axis A then moves the upper mold mounting portions 374 and 376 to above the mold mounts 212 and 216, respectively, while also positioning the mounting guide portions 378 and 380 above and between their associated guide rollers 224 of the mounting guides 220 as well as positioning the mounting guide portions 382 above the guide ramps 222 of the mounting guides 218. Upward movement of the mold support assembly 28 then causes the mold mounting guides 218 and 220 to respectively align the associated mounting guide portions of the upper mold support plate 372 so that the mold mounts 212 and 216 respectively engage the bottom sides of the mounting portions 374 and 376 to support the upper mold 38 at its proper location.

After mounting of the mold assembly 34' illustrated in FIG. 17, the mold support assembly is moved farther upwardly so that the loading cart 326 can be moved downstream along the axis A from the forming station 24 to the switching station 318 in preparation for receiving another mold assembly for preheating by subsequent movement to the preheating station 322.

After the above initial installation steps, the entire mold assembly 34' illustrated in FIG. 17 will then be suspended from the mold support assembly 28 illustrated in FIG. 16. The lower mold shuttle 50 illustrated in FIG. 8 at that time is located below the mold assembly and is moved upwardly from its lower position to its upper position by the vertically movable rollers 70 previously described in connection with FIGS. 8–10. The mold assembly is then moved downwardly such that the lower mold is supported on the lower mold shuttle prior to release of the detachable connectors 362 so that the upper mold 38 can move upwardly independently of the lower mold as illustrated in FIG. 14. After movement of the lower mold shuttle back to the position of FIGS. 8 and 9, the upper mold 38 is then free to commence the glass sheet forming operation as previously described.

Figure 22:
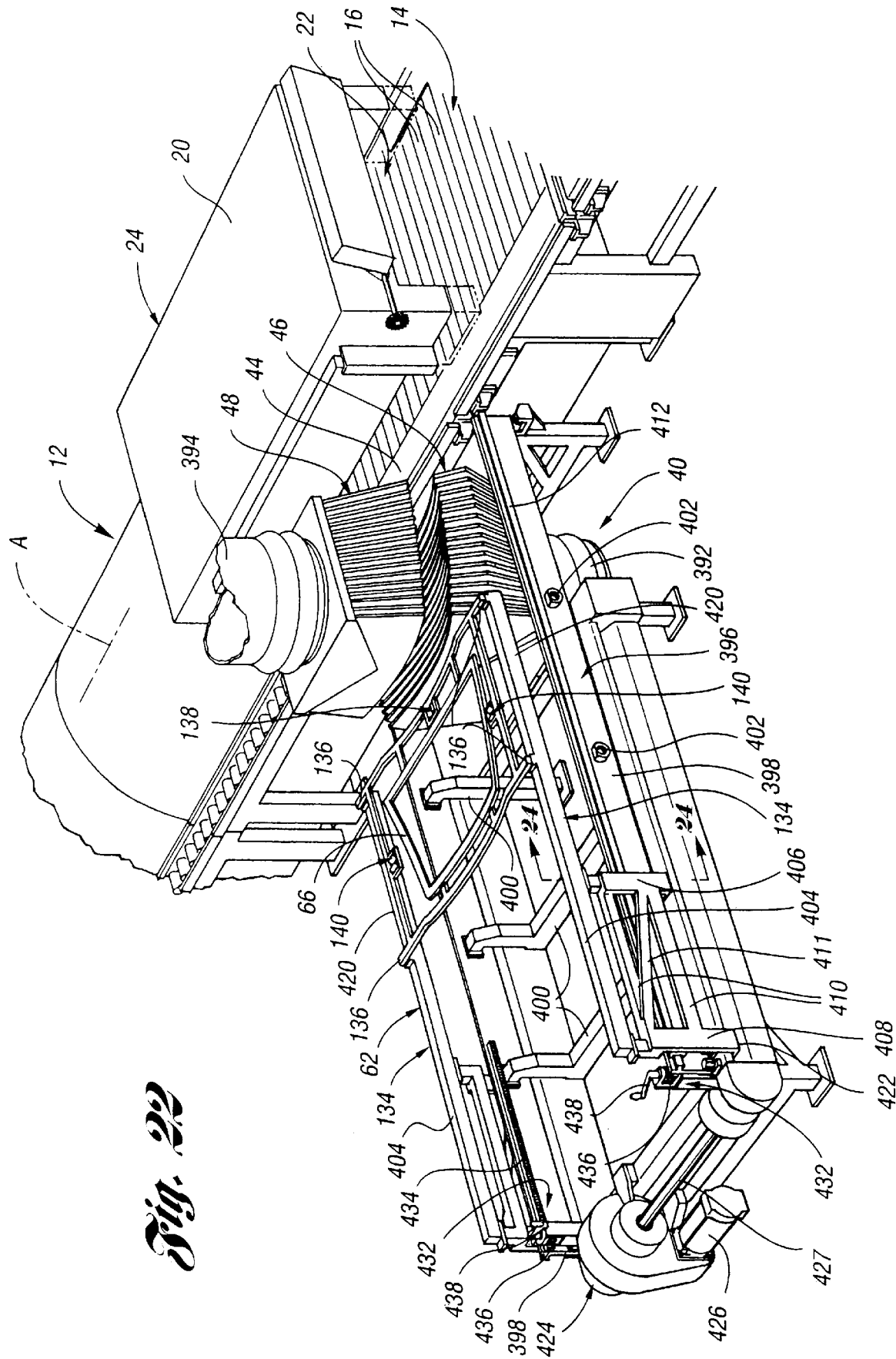
FIG. 22 is a perspective view illustrating the quench station of the apparatus and is illustrated in its operational condition.
Figure 23:
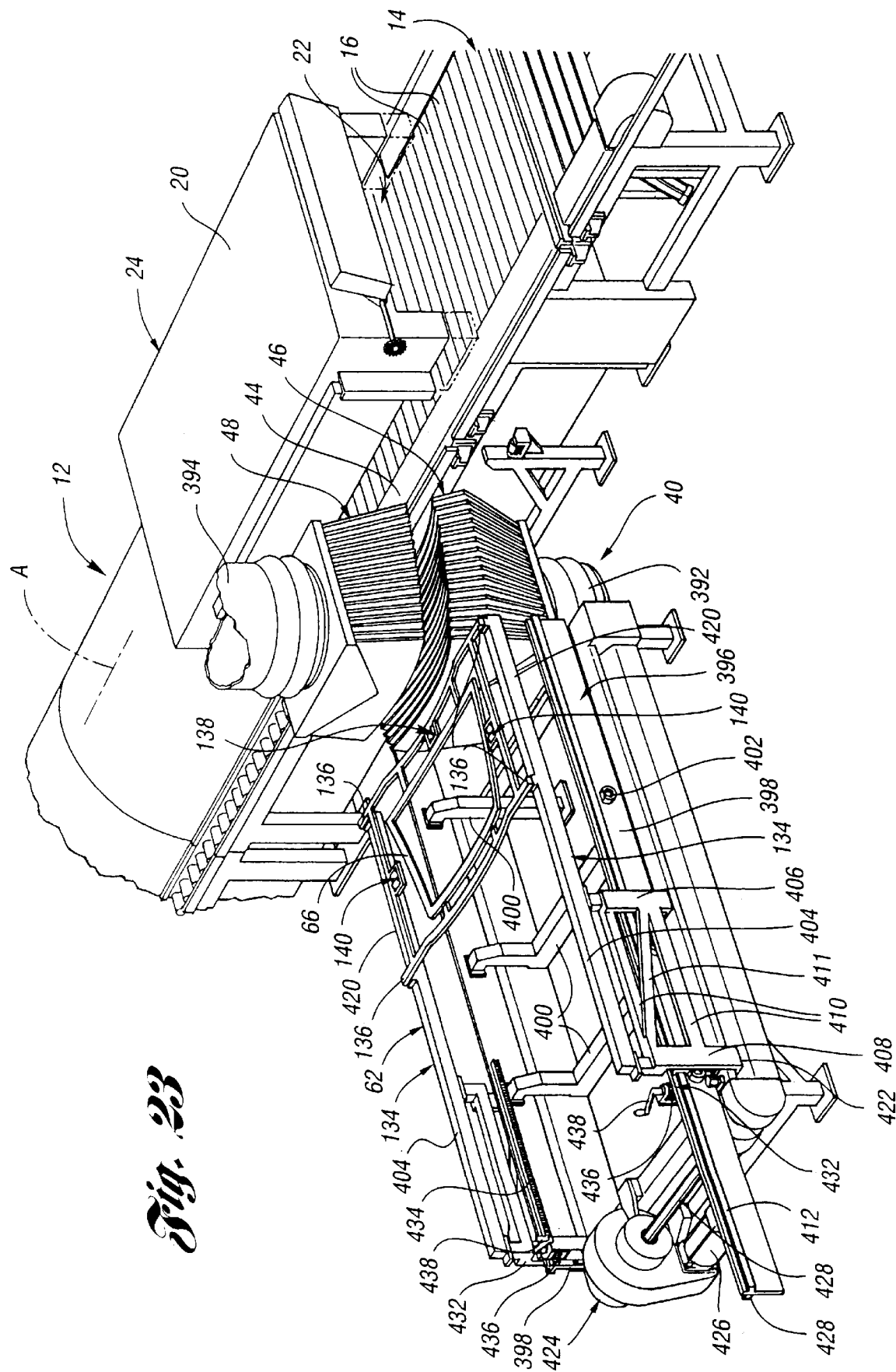
FIG. 23 is a view similar to FIG. 22 but shows the quench station with a rail on which the quench shuttle is moved in an idle position so as to facilitate changing of quench modules of the quench station.
Figure 24:
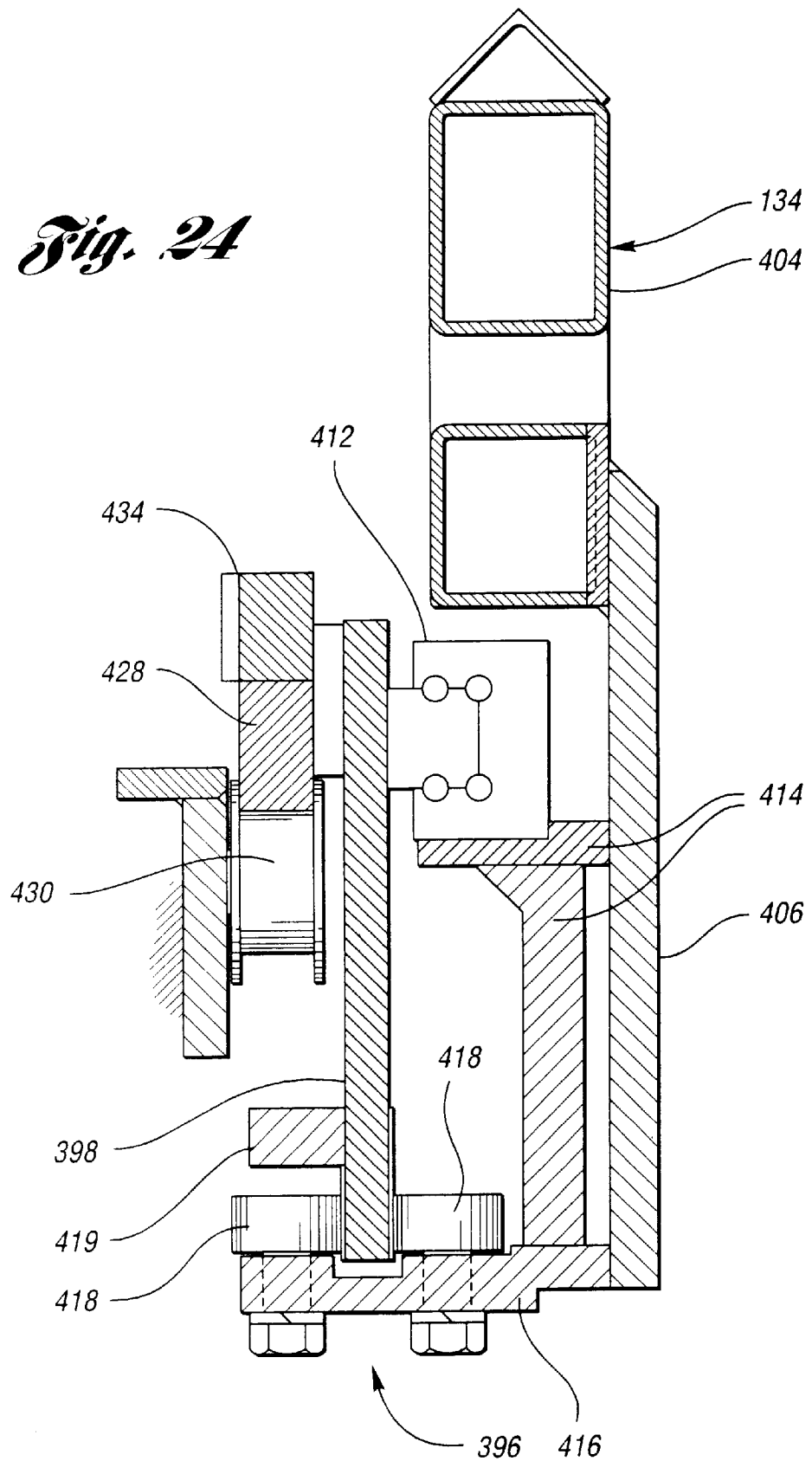
FIG. 24 is a sectional view taken along the direction of line 24—24 in FIG. 22 and illustrates the manner in which the quench shuttle is supported by the associated rail to move the quench ring between the forming station and the quench station.

With reference to FIG. 22, the quench station 40 of the system 10 is located adjacent the forming station 24 and includes lower and upper supply ducts 392 and 394 for providing pressurized air flow to the lower and upper quench modules 46 and 48 to perform the quenching as previously described in connection with FIGS. 2, 6, 8, 9, and 13. The quench station 40 as shown in FIG. 7 includes an upper catcher 395 that is a conveyor to which the quenched glass sheets are blown upwardly and then conveyed for delivery. As previously discussed, the quench station 40 includes a quench shuttle 62 that supports the quench ring 66 for movement to the forming station 24 to receive a formed glass sheet therefrom and then moves the quench ring 66 back to the quench station between the lower and upper quench modules 46 and 48 where the pressurized gas supply thereto provides quenching that heat strengthens or tempers the glass sheet. As shown in FIGS. 22, 23 and 24, a quench railway collectively indicated at 396 includes a pair of spaced rails 398 on which the pair of quench shuttle members 134 of the quench shuttle 62 are respectively moved between the forming and quench stations 24 and 40. More specifically, frame members 400 have upper ends to which the rails 398 are secured by detachable threaded connectors 402 to fixedly mount the rails for use. In this use position, the spaced rails 398 extend on opposite sides of the quench ducts 392 and 394 and the lower and upper quench modules 46 and 48 through which the pressurized quenching gas is supplied.

Each of the shuttle members 134 of the quench shuttle 62 has a supported end 404 that is mounted for movement along the associated rail 398 of the shuttle railway 396. These supported ends of the shuttle members 134 each includes a pair of vertical support members 406 and 408 that are connected by lower and upper horizontal support members 410 as well as by a diagonal brace 411.

Each of the vertical support members 406 and 408 of the supported end 404 of each shuttle member 134 is supported as illustrated in FIG. 24 for movement along the associated rail 398 to move the quench ring between the forming station and the quench station. More specifically, the rail 398 includes a linear bearing 412 that is secured by connectors 414 to the associated vertical support member, which is illustrated as the vertical support member 406 closest to the forming station 24 as shown in FIGS. 22 and 23. The lower end of each of the vertical support members 406 and 408, as illustrated in FIG. 24, supports a roller plate 416 on which inner and outer rollers 418 are mounted with the lower end of the rail 398 located therebetween just below a stiffener rib 419 of the rail. With this construction, the supported end 404 of each shuttle member 134 is mounted for movement along the direction of the rail without any rotation in a manner that permits the shuttle members 134 to have cantilevered ends 420 that support the quench ring 66 and are otherwise unconnected. It will be noted that the quench ring lock 148 shown in FIGS. 8, 9 and 13 is not illustrated on the quench shuttle members 134 in the views of FIGS. 22 and 23 but actually are mounted thereon to operate as previously described.

With continuing reference to FIG. 22, the vertical support member 406 of each supported end 404 of shuttle member 134 has a lower end 422 that extends downwardly and is connected to a belt drive mechanism 424 whose drive motor 426 provides the impetus for driving each of the quench shuttle members 134 in a manner coordinated by a cross shaft 427. At least one of the rail members 398 is movable from the use position illustrated in FIG. 22 where the shuttle is supported for movement between the forming station and the quench station to provide access that permits loading and unloading of a quench module set 44 as is hereinafter more fully described in connection with FIGS. 25 and 26. Actually, the quench station 40 as constructed permits each of its rails 398 to be moved from the use position so as to provide access to the quench modules 46 and 48 from both sides of the quench station.

With reference to FIG. 23, both of the rails 398 are mounted for movement as shown by the one rail from the use position to an idle position spaced from the forming station 24 so as to permit the access to the quench module set 44 including the lower and upper quench modules 46 and 48.

As illustrated in FIG. 24, each rail 398 of the quench railway has an inner rail member 428 that is supported by a number of stationary rollers 430 (only one shown) to mount the rail member for movement from the use position shown in FIG. 22 to the idle position shown in FIG. 23. This movement first requires that the connectors 402 be detached so that the rail 398 can be moved with respect to the frame members 400. After movement back to the use position of FIG. 22, the connectors 402 are reconnected so that the quench shuttle 62 can again be moved between the forming station 24 and the quench station 40.

As illustrated in FIG. 22, each of the rails 398 includes an actuator 432 for moving the associated rail between the use and idle positions of FIGS. 22 and 23. More specifically, each actuator 432 includes a toothed rack 434 secured to the rail and a pinion 436 meshed with the rack and rotatable to thus move the rack between the use and idle positions. A manual crank 438 of each actuator rotates the associated pinion 436 to provide the rail movement.

With the quench station 40 accessible, as illustrated in FIG. 23, loading and unloading of a quench module set 44 can be conveniently performed by the quench loader 42 illustrated in FIGS. 25 and 26. More specifically, the quench loader 42 includes a quench carriage 440 having a pair of spaced sides 442 and an end 444 that extends between the sides thereof to define a horizontally opening U shape that receives the quench module set 44 of the lower quench module 46 and the upper quench module 48. The quench carriage 440 includes mounts 446 for mounting the quench module set 44 of the lower and upper quench modules 46 and 48 to permit use thereof with the lower and upper supply ducts of the quench station as previously described. The carriage 440 also permits subsequent movement of the quench module set 44 of the lower and upper quench modules 46 and 48 from the quench station 40 to permit use of another set of lower and upper quench modules in the quench station.

As illustrated in FIG. 26, the quench loader 42 includes an overhead crane 447 that supports the quench carriage 440 and also includes an overhead railway 448 along which the crane 447 moves to move the quench carriage and the quench module set 44 of the lower and upper quench modules 46 and 48 mounted thereby to and from the quench station 40. The overhead crane 447 includes cables 450 by which the carriage 440 is suspended and which are received by pulleys 452 driven by a motor control to move the carriage vertically during the installation and removal procedures, as is hereinafter more fully described. Trolleys 453 support the crane 447 for movement to and from the quench station for the quench module installation.

With continuing reference to FIG. 26, each side 442 of the quench carriage 440 includes the mounts 446, which are lower mounts for supporting the lower quench module 46, and also includes upper mounts 454 for mounting the upper quench module 48. More specifically, the lower mounts 446 are embodied by hooks whose lower hooked ends 456 are received by catchers 458 of the lower quench module 46 to provide its support. Furthermore, the upper mounts 454 are embodied by pads that are engaged by downwardly facing mounts 460 of the upper quench module 48. Furthermore, the lower mounts 446 are mounted on the sides of the quench carriage for horizontal movement such that their lower ends 456 move between the phantom and solid line indicated positions which facilitates the installation and removal of the quench modules. More specifically, the hook-shaped lower mounts 446 are each mounted by a rod 462 in cooperation with bearings 464 and a handle 466 provides the horizontal movement. It will be noted that the lower mount 446 and lower quench module catcher 458 in the lower foreground of FIG. 26 are higher than the lower mount 446 and catcher 458 shown upwardly and to the right so that the carriage can move into position with the lower mounts positioned as shown as the leading lower mounts pass over the shorter catchers 458 upon moving toward the taller catchers 458.

As also illustrated in FIG. 26, each of the pressurized air supply ducts, such as the lower supply duct 392 illustrated, includes keys 468 and each of the quench modules includes adjustable keyways 470 for receiving the associated duct key. Upon the initial installation of each quench module set 44, each adjustable keyway 70 is adjusted so as to provide proper positioning of the associated quench module. Thereafter, no further adjustment is necessary upon each installation. Also, each side 442 of the carriage 440 includes stops 472 that engage stops 474 of the adjacent quench module keyway 470 to provide proper positioning thereof with respect to the quench modules during the installation and removal procedures.

Upon installation of the quench module set 44, the quench carriage 440 supporting the quench module set 44, as previously described, is moved from adjacent the quench station 40 to the quench station. The overhead crane 447 is then operated to lower the quench module set 44 so that the lower quench module 46 can be mounted on the associated lower supply duct 392 and, after adjustment by the keyways to the proper position, secured by suitable conventional clamps. Rod handle 466 then moves the lower mounts 446 horizontally on the quench carriage sides 442 so that their lower hooked ends 456 move from the solid line indicated positions to the phantom line indicated positions and thus release the quench carriage from the lower catchers 458 and hence from the lower quench module 46. Thereafter, the overhead crane 447 moves the upper quench module 48 upwardly so that its keyways 470 receive the keys of the upper supply duct for positioning adjustment and mounting on the upper supply duct by conventional clamps. The quench carriage is then moved back out of the quench station, and subsequent movement of the one quench rail 398 from the idle position of FIG. 23 to the use position of FIG. 22 then readies the quench station 40 for its operation.

Unloading of the quench module set 44 is essentially the reverse of the installation process with the upper quench module 48 first being supported by the carriage 440 and the lower quench module 46 then being supported prior to movement on the railway 448 from the quench station 40.

With reference to FIG. 14, there are two of the support members 129 that each mounts two of the four lower supports 94 of the lower mold support assembly 60. Each support member 129 is made as a stainless steel plate and has opposite ends 476 that project outwardly from the system housing 20. The support member ends 476 at each lateral side of the system are supported by a chain rail 478 that is mounted on a horizontal beam 480 supported by vertical posts 482 that extend upwardly from the factory floor 238. Each chain rail 478 also slidably supports a continuous chain 484 that is movable along the length of the system and that supports the adjacent end of the conveyor rolls 16 for frictional driving to provide the glass sheet conveyance on the rolls between the lower supports 94. A lower portion 486 of the support member 129 supports an array 488 of the gas jet pumps 58. More specifically, the support member lower portion 486 mounts rollers 490 on which a support and stop member 492 is mounted for movement along the length of the system axis along which the glass sheets are conveyed. Member 492 supports rolls 494 of the gas jet pump array 488 so that this array can also be moved along the system axis. Member 492 includes a stop 496 that is located below the location where the lower mold 36 is located in its use position as shown. This stop 496 engages the gas jet pump array 488 so that its gas jet pumps 58 are located between the conveyor rolls 16 as shown in FIG. 3. Member 492 projects outwardly from the end of the system housing 20 adjacent the switching station previously described and is adjustably positioned so as to ensure the proper location of the stop 496 for positioning the gas jet pumps 58. Likewise, the gas jet pump array 488 also projects outwardly from the same end of the system housing so that it is removable for servicing. Adjustment of the stop 496 to accommodate for thermal expansion can thus be accomplished outside of the heated chamber to ensure that the gas jet pumps 58 are properly positioned.

While the best modes for practicing the invention have been disclosed, those familiar with the art to which the invention relates will recognize alternative modes and ways for practicing the invention as defined by the following claims.

What is claimed is:

1. A glass sheet forming and quench system, comprising:
   a forming station for forming heated glass sheets;
   a quench station located adjacent the forming station and including lower and upper supply ducts for providing pressurized air flow, and a quench shuttle for moving a quench ring between the forming station where a heated and formed glass sheet is received thereby and the quench station for quenching of the formed glass sheet; and
   a quench loader including a quench carriage having a pair of spaced sides and an end that extends between the sides thereof to define a horizontally opening U shape that receives a set of lower and upper quench modules, the quench carriage including mounts for mounting the set of lower and upper quench modules within its U shape for movement to the quench station to permit use thereof with the lower and upper supply ducts, and the carriage permitting subsequent movement of the set of lower and upper quench modules thereon from the quench station to permit use of another set of lower and upper quench modules in the quench station.

2. A glass sheet forming and quench system as in claim 1 wherein the quench loader includes an overhead crane that supports the quench carriage, and an overhead railway along which the crane moves to move the quench carriage and the set of lower and upper quench modules mounted thereby to and from the quench station.

3. A glass sheet forming and quench system as in claim 2 wherein the mounts of the quench carriage are located on the sides of the quench carriage.

4. A glass sheet forming and quench system as in claim 3 wherein each side of the quench carriage includes lower and upper mounts for respectively mounting the lower and upper quench modules.

5. A glass sheet forming and quench system as in claim 4 wherein the lower mounts are embodied by hooks and the upper mounts are embodied by pads.

6. A glass sheet forming and quench system as in claim 5 wherein the hooks are mounted on the sides of the quench carriage for horizontal movement.

7. A glass sheet forming and quench system as in claim 3 wherein each side of the quench carriage includes a stop for engaging the quench module set to provide positioning of the quench carriage with respect to the quench modules.

8. A glass sheet forming and quench system as in claim 1 further including an elongated heating furnace having a primary axis along which the glass sheets are conveyed for heating, the forming station being located in alignment with the heating furnace along the primary axis, the quench station extending from the forming station in a transverse direction with respect to the primary axis, a quench railway including a pair of spaced rails that extend from the forming station on opposite sides of the supply ducts, and at least one of the rails being movable from a use position where the shuttle is supported for movement between the forming station and the quench station.

9. A glass sheet forming system as in claim 8 wherein the one rail is mounted for movement from the use position to an idle position spaced from the forming station.

10. A glass sheet forming and quench system as in claim 9 which includes an actuator for moving said one rail between the use and idle positions.

11. A glass sheet forming and quench system as in claim 10 wherein the actuator includes a rack secured to said one rail and a pinion meshed with the rack and rotatable to move said one rail between the use and idle positions.

12. A glass sheet forming and quench system as in claim 11 wherein the actuator further includes a manual crank for rotating the pinion.

13. A glass sheet forming and quench system as in claim 9 wherein the other rail also is movable between a use position adjacent the forming station and an idle position spaced from the forming station.

14. A glass sheet forming and quench system as in claim 13 wherein each rail includes an actuator for providing movement thereof between the use and idle positions.

15. A glass sheet forming and quench system as in claim 14 wherein each actuator includes a rack secured to its rail and a rotatable pinion meshed with the rack thereof and rotatable to move its rail between the use and idle positions.

16. A glass sheet forming and quench system as in claim 15 further including a manual pinion crank for providing pinion rotation.

17. A glass sheet forming and quench system, comprising:
   an elongated heating furnace for providing heating of glass sheets during conveyance along a primary axis of the system;
   a forming station located in alignment with the heating furnace along the primary axis;
   a quench station that extends from the forming station in a transverse direction with respect to the primary axis, the quench station including lower and upper supply ducts for providing pressurized air flow, a railway including a pair of spaced rails that extend from the forming station on opposite sides of the supply ducts, at least one of the rails being movable between a use position adjacent the forming station and an idle position spaced from the forming station, an actuator including a rack on said one rail and a pinion meshed with the rack and rotatable to move the one rail between the use and idle positions, and a quench shuttle for moving a quench mold along the spaced rails of the railway with said one rail in the use position for movement between the forming station where a heated and formed glass sheet is received thereby and the quench station for quenching of the formed glass sheet; and a quench loader including an overhead crane movable to and from the quench station and a quench carriage suspended from the crane to move a set of lower and upper quench modules to and from the quench station with said one rail thereof in the idle position spaced from the forming station, the movement of the set of lower and upper quench modules to the quench station permitting use thereof with the lower and upper quench ducts and movement of said one rail to the use position permitting operation of the quench shuttle, and the quench carriage permitting subsequent movement of the set of lower and upper quench modules from the quench station to permit subsequent use of another set of lower and upper quench modules in the quench station.

* * * * *